(12) United States Patent
Ranum et al.

(10) Patent No.: US 9,088,606 B2
(45) Date of Patent: Jul. 21, 2015

(54) SYSTEM AND METHOD FOR STRATEGIC ANTI-MALWARE MONITORING

(71) Applicant: Tenable Network Security, Inc., Columbia, MD (US)

(72) Inventors: Marcus J. Ranum, Morrisdale, PA (US); Ron Gula, Marriottsville, MD (US)

(73) Assignee: TENABLE NETWORK SECURITY, INC., Columbia, MD (US)

( * ) Notice: Subject to any disclaimer, the term of this patent is extended or adjusted under 35 U.S.C. 154(b) by 245 days.

(21) Appl. No.: 13/692,200

(22) Filed: Dec. 3, 2012

(65) Prior Publication Data

US 2014/0013434 A1    Jan. 9, 2014

Related U.S. Application Data

(60) Provisional application No. 61/668,278, filed on Jul. 5, 2012.

(51) Int. Cl.
*H04L 29/06*        (2006.01)

(52) U.S. Cl.
CPC .......... *H04L 63/145* (2013.01); *H04L 63/1416* (2013.01); *H04L 63/1433* (2013.01)

(58) Field of Classification Search
CPC .................................................... H04L 63/145
USPC ......................................................... 726/24
See application file for complete search history.

(56) References Cited

U.S. PATENT DOCUMENTS

| | | | |
|---|---|---|---|
| 4,525,599 A | 6/1985 | Curran et al. | |
| 5,541,997 A | 7/1996 | Pappas et al. | |
| 5,572,729 A | 11/1996 | Giordano et al. | |
| 5,715,391 A | 2/1998 | Jackson et al. | |
| 5,721,819 A | 2/1998 | Galles et al. | |
| 5,838,919 A | 11/1998 | Schwaller et al. | |
| 5,844,817 A | 12/1998 | Lobley et al. | |
| 6,154,775 A | 11/2000 | Coss et al. | |
| 6,266,774 B1 | 7/2001 | Sampath et al. | |

(Continued)

OTHER PUBLICATIONS

Hoagland, James A., "Audit Log Analysis Using the Visual Audit Browser Toolkit", Department of Computer Science, University of California, Davis.

(Continued)

*Primary Examiner* — Justin T Darrow
(74) *Attorney, Agent, or Firm* — Muncy, Geissler, Olds & Lowe, P.C.

(57) ABSTRACT

The system and method described herein may leverage active network scanning and passive network monitoring to provide strategic anti-malware monitoring in a network. In particular, the system and method described herein may remotely connect to managed hosts in a network to compute hashes or other signatures associated with processes running thereon and suspicious files hosted thereon, wherein the hashes may communicated to a cloud database that aggregates all known virus or malware signatures that various anti-virus vendors have catalogued to detect malware infections without requiring the hosts to have a local or resident anti-virus agent. Furthermore, running processes and file system activity may be monitored in the network to further detect malware infections. Additionally, the network scanning and network monitoring may be used to detect hosts that may potentially be participating in an active botnet or hosting botnet content and audit anti-virus strategies deployed in the network.

30 Claims, 5 Drawing Sheets

(56) References Cited

U.S. PATENT DOCUMENTS

| | | |
|---|---|---|
| 6,324,656 B1 | 11/2001 | Gleichauf et al. |
| 6,393,568 B1 | 5/2002 | Ranger et al. |
| 6,415,321 B1 | 7/2002 | Gleichauf et al. |
| 6,487,666 B1 | 11/2002 | Shanklin et al. |
| 6,499,107 B1 | 12/2002 | Gleichauf et al. |
| 6,510,509 B1 | 1/2003 | Chopra et al. |
| 6,606,663 B1 | 8/2003 | Liao et al. |
| 6,704,874 B1 | 3/2004 | Porras et al. |
| 6,711,127 B1 | 3/2004 | Gorman et al. |
| 6,789,202 B1 | 9/2004 | Ko et al. |
| 6,847,982 B2 | 1/2005 | Parker et al. |
| 6,873,617 B1 | 3/2005 | Karras |
| 6,882,728 B1 | 4/2005 | Takahashi et al. |
| 6,886,020 B1 | 4/2005 | Zahavi et al. |
| 6,952,779 B1 | 10/2005 | Cohen et al. |
| 6,957,348 B1 | 10/2005 | Flowers et al. |
| 6,968,377 B1 | 11/2005 | Gleichauf et al. |
| 7,013,395 B1 | 3/2006 | Swiler et al. |
| 7,017,186 B2 | 3/2006 | Day |
| 7,073,198 B1 | 7/2006 | Flowers et al. |
| 7,093,287 B1 | 8/2006 | Gusler et al. |
| 7,120,148 B1 | 10/2006 | Batz et al. |
| 7,134,141 B2 | 11/2006 | Crosbie et al. |
| 7,139,819 B1 | 11/2006 | Luo et al. |
| 7,162,742 B1 | 1/2007 | Flowers et al. |
| 7,181,769 B1 | 2/2007 | Keanini et al. |
| 7,237,264 B1 | 6/2007 | Graham et al. |
| 7,243,366 B2 | 7/2007 | Medvinsky et al. |
| 7,272,646 B2 | 9/2007 | Cooper et al. |
| 7,290,145 B2 | 10/2007 | Falkenthros |
| 7,310,687 B2 | 12/2007 | Psounis et al. |
| 7,324,551 B1 | 1/2008 | Stammers |
| 7,483,986 B2 | 1/2009 | Hanson et al. |
| 7,509,681 B2 | 3/2009 | Flowers et al. |
| 7,530,104 B1 | 5/2009 | Thrower et al. |
| 7,562,388 B2 | 7/2009 | Hackenberger et al. |
| 7,571,482 B2 | 8/2009 | Polyakov et al. |
| 7,594,273 B2 | 9/2009 | Keanini et al. |
| 7,603,711 B2 | 10/2009 | Scheidell |
| 7,653,647 B2 | 1/2010 | Borthakur et al. |
| 7,661,134 B2 | 2/2010 | Radatti |
| 7,735,100 B1 | 6/2010 | Sallam |
| 7,735,140 B2 | 6/2010 | Datla et al. |
| 7,739,377 B2 | 6/2010 | Benedetti et al. |
| 7,752,671 B2 | 7/2010 | Kotler et al. |
| 7,761,918 B2 | 7/2010 | Gula et al. |
| 7,774,848 B2 | 8/2010 | D'Mello et al. |
| 7,882,542 B2 | 2/2011 | Neystadt et al. |
| 7,895,651 B2 | 2/2011 | Brennan |
| 7,904,479 B2 | 3/2011 | Zuk |
| 7,904,962 B1 | 3/2011 | Jajodia et al. |
| 7,908,254 B2 | 3/2011 | Suemondt et al. |
| 7,926,113 B1 | 4/2011 | Gula et al. |
| 7,966,358 B2 | 6/2011 | Deolalikar et al. |
| 7,971,252 B2 | 6/2011 | Lippmann et al. |
| 7,975,298 B1 | 7/2011 | Venkatasubrahmanyam |
| 7,996,836 B1 | 8/2011 | McCorkendale et al. |
| 8,001,606 B1 | 8/2011 | Spertus |
| 8,015,284 B1 | 9/2011 | Isenberg et al. |
| 8,032,489 B2 | 10/2011 | Villella et al. |
| 8,126,853 B2 | 2/2012 | Sakamoto |
| 8,135,815 B2 | 3/2012 | Mayer |
| 8,135,823 B2 | 3/2012 | Cole et al. |
| 8,191,149 B2 | 5/2012 | Yun et al. |
| 8,201,257 B1 | 6/2012 | Andres et al. |
| 8,239,942 B2 | 8/2012 | Shanklin et al. |
| 2001/0034847 A1 | 10/2001 | Gaul, Jr. |
| 2002/0019945 A1 | 2/2002 | Houston et al. |
| 2002/0093527 A1 | 7/2002 | Sherlock et al. |
| 2002/0100023 A1 | 7/2002 | Ueki et al. |
| 2002/0107841 A1 | 8/2002 | Hellerstein et al. |
| 2002/0138762 A1 | 9/2002 | Horne |
| 2002/0166063 A1 | 11/2002 | Lachman, III et al. |
| 2002/0199116 A1 | 12/2002 | Hoene et al. |
| 2003/0051026 A1 | 3/2003 | Carter et al. |
| 2003/0056116 A1 | 3/2003 | Bunker, V et al. |
| 2003/0135517 A1 | 7/2003 | Kauffman |
| 2003/0145225 A1 | 7/2003 | Bruton, III et al. |
| 2003/0196123 A1 | 10/2003 | Rowland et al. |
| 2003/0212779 A1 | 11/2003 | Boyter et al. |
| 2003/0220940 A1 | 11/2003 | Futoransky et al. |
| 2004/0003266 A1 | 1/2004 | Moshir et al. |
| 2004/0015719 A1 | 1/2004 | Lee et al. |
| 2004/0042470 A1 | 3/2004 | Cooper et al. |
| 2004/0093521 A1 | 5/2004 | Hamadeh et al. |
| 2004/0193918 A1 | 9/2004 | Green et al. |
| 2004/0250169 A1 | 12/2004 | Takemori et al. |
| 2005/0044390 A1 | 2/2005 | Trostle |
| 2005/0068928 A1 | 3/2005 | Smith et al. |
| 2005/0097199 A1 | 5/2005 | Woodard et al. |
| 2005/0108578 A1 | 5/2005 | Tajalli et al. |
| 2005/0128988 A1 | 6/2005 | Simpson et al. |
| 2005/0188419 A1 | 8/2005 | Dadhia et al. |
| 2005/0203886 A1 | 9/2005 | Wong |
| 2005/0203921 A1 | 9/2005 | Newman et al. |
| 2005/0229255 A1 | 10/2005 | Gula et al. |
| 2006/0010245 A1 | 1/2006 | Carnahan |
| 2006/0018466 A1 | 1/2006 | Adelstein et al. |
| 2006/0031476 A1 | 2/2006 | Mathes et al. |
| 2006/0117091 A1 | 6/2006 | Justin |
| 2006/0130144 A1 | 6/2006 | Wernicke |
| 2006/0184682 A1 | 8/2006 | Suchowski et al. |
| 2007/0028110 A1 | 2/2007 | Brennan |
| 2007/0028302 A1 | 2/2007 | Brennan et al. |
| 2007/0028304 A1 | 2/2007 | Brennan |
| 2007/0169190 A1 | 7/2007 | Kolton et al. |
| 2007/0240220 A1 | 10/2007 | Tuvell et al. |
| 2007/0271598 A1 | 11/2007 | Chen et al. |
| 2007/0277238 A1 | 11/2007 | Margalit et al. |
| 2008/0002725 A1 | 1/2008 | Alicherry et al. |
| 2008/0022400 A1 | 1/2008 | Cohen et al. |
| 2008/0046393 A1 | 2/2008 | Jajodia et al. |
| 2008/0047009 A1 | 2/2008 | Overcash et al. |
| 2008/0072285 A1 | 3/2008 | Sankaran et al. |
| 2008/0086772 A1* | 4/2008 | Chesla .......................... 726/23 |
| 2008/0155084 A1 | 6/2008 | Yu et al. |
| 2009/0013141 A1 | 1/2009 | Kinoshita |
| 2009/0044024 A1 | 2/2009 | Oberheide et al. |
| 2009/0049016 A1 | 2/2009 | Sakamoto |
| 2009/0077666 A1 | 3/2009 | Chen et al. |
| 2009/0177782 A1 | 7/2009 | Blatherwick et al. |
| 2010/0030780 A1 | 2/2010 | Eshghi et al. |
| 2010/0043066 A1 | 2/2010 | Miliefsky |
| 2010/0058431 A1 | 3/2010 | McCorkendale et al. |
| 2010/0058456 A1 | 3/2010 | Jajodia et al. |
| 2010/0077479 A1 | 3/2010 | Viljoen |
| 2010/0083381 A1 | 4/2010 | Khosravi et al. |
| 2010/0114842 A1 | 5/2010 | Forman et al. |
| 2010/0138925 A1 | 6/2010 | Barai et al. |
| 2010/0169975 A1 | 7/2010 | Stefanidakis et al. |
| 2010/0174921 A1 | 7/2010 | Abzarian et al. |
| 2010/0175106 A1 | 7/2010 | Diebler et al. |
| 2010/0175134 A1 | 7/2010 | Ali-Ahmad et al. |
| 2010/0175135 A1 | 7/2010 | Kandek et al. |
| 2010/0262688 A1 | 10/2010 | Hussain et al. |
| 2010/0281539 A1 | 11/2010 | Burns et al. |
| 2010/0281543 A1 | 11/2010 | Golomb et al. |
| 2010/0332593 A1 | 12/2010 | Barash et al. |
| 2011/0029772 A1 | 2/2011 | Fanton et al. |
| 2011/0047597 A1 | 2/2011 | Mahaffey et al. |
| 2011/0061104 A1 | 3/2011 | Sarraute Yamada et al. |
| 2011/0099620 A1 | 4/2011 | Stavrou et al. |
| 2011/0126287 A1 | 5/2011 | Yoo |
| 2011/0162070 A1 | 6/2011 | Krasser et al. |
| 2011/0185055 A1 | 7/2011 | Nappier et al. |
| 2011/0185431 A1 | 7/2011 | Deraison |
| 2011/0191854 A1 | 8/2011 | Giakouminakis et al. |
| 2011/0231934 A1 | 9/2011 | Davis et al. |
| 2011/0231935 A1 | 9/2011 | Gula et al. |
| 2011/0277034 A1 | 11/2011 | Hanson |
| 2011/0314245 A1 | 12/2011 | Hanes et al. |
| 2012/0011590 A1 | 1/2012 | Donovan |
| 2012/0158725 A1 | 6/2012 | Molloy et al. |
| 2012/0233700 A1 | 9/2012 | Ali-Ahmad et al. |

(56) References Cited

U.S. PATENT DOCUMENTS

OTHER PUBLICATIONS

Tenable Network Security, "Log Correlation Engine 4.0 High Performance Configuration Guide", Jul. 10, 2012, Revision 2.

Tenable Network Security, "Log Correlation Engine Best Practices", Mar. 2, 2012, Revision 2.

Gula, Ron, "Tenable Event Correlation", Tenable Network Security, Mar. 1, 2012, Revision 1.

FortiAnalyzer TM, Administration Guide, Version 4.0 MR2, Mar. 21, 2011, Revision 13.

Wack, John, et al., NIST Special Publication 800-42, "Guideline on Network Security Testing", Computer Security Division, National Institute of Standards and Technology, Oct. 2003, pp. 1-92.

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al., "Detecting Backdoors", Proceedings of the 9th USENIX Security Symposium, Denver, Colorado, Aug. 2000, 11 pages.

"Basic Cryptanalysis", Department of the Army, Field Manual No. 34-40-2, Sep. 13, 1990, 363 pages.

Kim, Gene H., et al., "The Design and Implementation of Tripwire: A File System Integrity Checker", Proceedings of the 2nd ACM Conference on Computer and Communications Security, 1994, (Purdue Technical Report CSD-TR-93-071), 18 pages.

Oline, Adam, et al., "Exploring Three-Dimensional Visualization for Intrusion Detection", Workshop on Visualization for Computer Security, IEEE, Oct. 26, 2005, 9 pages.

Gula, Ron, "Predicting Attack Paths: Leveraging active and passive vulnerability discovery to identify trusted exploitable weak points in your network", Tenable Network Security, Inc, Mar. 20, 2012, Revision 2.

"Strategic Anti-malware Monitoring with Nessus, PVS, & LCE", Tenable Network Security, Inc, May 29, 2012, Revision 1.

\* cited by examiner

SYSTEM AND METHOD FOR STRATEGIC ANTI-MALWARE MONITORING

CROSS-REFERENCE TO RELATED APPLICATIONS

The present application claims priority under 35 U.S.C. §119(e) to U.S. Provisional Patent Application Ser. No. 61/668,278, entitled "System and Method for Strategic Anti-Malware Monitoring," filed Jul. 5, 2012, the contents of which are hereby incorporated by reference in their entirety.

FIELD OF THE INVENTION

The invention generally relates to a system and method for strategic anti-malware monitoring in a network, and in particular, to leveraging active network scanning and passive network monitoring and cloud databases to determine whether any hosts in the network are running processes or hosting content that match known virus or malware signatures that various different anti-virus vendors have catalogued to detect malware infections without requiring the hosts to have a local or resident anti-virus agent, detect hosts that may potentially be participating in an active botnet or hosting botnet content, and audit anti-virus strategies deployed in the network.

BACKGROUND OF THE INVENTION

In many network environments, illegal or unauthorized users may exploit vulnerabilities in the network to gain access, deny access, or otherwise attack systems in the network. As such, to detect and remediate such network vulnerabilities, existing network security systems typically conduct vulnerability analysis in the network through manual inspection or network scans. For example, conventional network scanners (or "active vulnerability scanners") typically send packets or other messages to various devices in the network and then audit the network with information contained in any response packets or messages received from the devices in the network. Accordingly, physical limitations associated with the network typically limit the effectiveness for active vulnerability scanners because only devices that can communicate with the active vulnerability scanners can be audited, while actively scanning networks distributed over large areas or having large numbers of devices may take long amounts of time. For example, in a network that includes multiple routers, hosts, and other network devices, an active vulnerability scanner would typically have to send packets that traverse several routers to scan the hosts and other network devices, some of which may be inactive and therefore inaccessible to the active vulnerability scanner. Further, in scenarios where one or more of the routers have firewalls that screen or otherwise filter incoming and outgoing traffic, the active vulnerability scanner may generate incomplete results because the firewalls may prevent the active vulnerability scanner from auditing hosts or other devices behind the firewalls.

Furthermore, active vulnerability scanners typically create audit results that become stale over time because the audit results describe a static state for the network at a particular point in time. Thus, an active vulnerability scanner would likely fail to detect that hosts have been added or removed from the network following a particular active scan, whereby the audit results that active vulnerability scanners create tend to steadily decrease in value over time as changes to the network occur. Furthermore, active vulnerability scanners can have the tendency to cause network disruptions during an audit. For example, probing network hosts or other devices during an audit performed by an active vulnerability scanner may result in communication bottlenecks, processing overhead, and instability, among other potential problems in the network. Thus, deployment locations, configurations, and other factors employed to manage networks can often interfere with obtaining suitable network auditing results using only active vulnerability scanners.

As such, existing systems that tend to rely entirely on active vulnerability scanners typically prevent the active vulnerability scanner from obtaining comprehensive information that describes important settings, configurations, or other information associated with the network. In particular, malicious or unauthorized users often employ various techniques to obscure network sessions during an attempted breach, but active vulnerability scanners often cannot detect real-time network activity that may provide indications that the attempted breach is occurring. For example, many backdoor and rootkit applications tend to use non-standard ports and custom protocols to obscure network sessions, whereby intruders may compromise the network while escaping detection. Thus, many active vulnerability scanners can only audit the state of a network at a particular point in time, but suitably managing network security often requires further insight relating to real-time activity that occurs in the network. Accordingly, although active vulnerability scanners typically employed in existing network security systems can obtain certain information describing the network, existing systems cannot perform comprehensive security audits to completely describe potential vulnerabilities in the network, build models or topologies for the network, or derive other information that may be relevant to managing the network.

Furthermore, in many instances, certain hosts or devices may participate in sessions occurring on the network, yet the limitations described above can prevent active vulnerability scanners alone from suitably auditing the hosts or devices. As such, various existing network security systems employ one or more passive vulnerability scanners in combination with active vulnerability scanners to analyze traffic traveling across the network, which may supplement the information obtained from the active vulnerability scanners. However, even when employing passive vulnerability scanners in combination with active vulnerability scanners, the amount of data returned by the active vulnerability scanners and the passive vulnerability scanners can often be quite substantial, which can lead to difficulties in administrating the potentially large number of vulnerabilities and assets in the network because many network topologies may include hundreds, thousands, or even larger numbers of nodes, whereby suitably representing the network topologies in a manner that provides visibility into the network can be unwieldy. For example, an important concern in managing network vulnerabilities relates to detecting viruses or other malware on managed hosts and identifying weak points that may compromise the network or otherwise expose the network to viruses, malware, or other threats. In general, protecting a network against viruses or other malware typically requires information technology administrators to manage anti-malware software themselves and install resident anti-malware agents on managed hosts in the network.

However, existing anti-malware solutions that rely upon resident anti-malware agents have various limitations and drawbacks, including that anti-malware agents typically have millions or billions of signatures and therefore require defended systems to have the anti-malware agent installed thereon and continuously monitor a file system associated with the defended system to perform the in-depth analysis needed to find or otherwise detect malicious data and activity, which can consume substantial resources and hinder performance. Furthermore, anti-malware agents typically only leverage the technology associated with one anti-malware vendor because installing every known anti-malware technology can further severely impact performance, whereby anti-malware agents often do not evaluate defended systems against the entire malware sample that may be known in the industry. Consequently, anti-malware agents can have substantial gaps in coverage because attackers often specifically create infections or malware payloads to bypass detection with certain anti-virus vendor technologies. For example, if an attacker knows that a particular organization has deployed "Brand X" anti-malware agents on managed hosts in a network, the attacker may specifically package malware in a manner that escapes detection with "Brand X" anti-malware agents even though "Brand Y" anti-malware agents may detect the same malware package. In another example, polymorphic and mutating viruses raise the possibility that one anti-virus technology may detect a malicious sample while other anti-virus technologies may completely miss the same malicious sample. Accordingly, because running every anti-virus technology available on the market to close gaps in coverage cannot be feasibly done without severely burdening performance, anti-malware strategies that use resident agents suffer from various drawbacks and limitations that may expose a network to malicious data and activity.

In addition to the drawbacks and limitations that may arise from relying upon resident anti-malware agents, any single or even layered anti-malware strategy may not fully protect a network against all the possible avenues through which viruses and other malware may compromise a network. For example, even if a malware infection has been detected and remediated on certain managed hosts in a network, existing anti-malware solutions typically do not (or cannot) assess how the malware infection arose or the extent to which the malware infection may have spread throughout the network. However, knowing details relating to whether and/or how the malware infection originated and propagated can be critical to properly isolating and remediating the infection (e.g., different concerns may be implicated if the infection arose because one employee opened a bad attachment that compromised a standalone host versus a widespread inspection that has compromised a substantial portion of the network environment). Furthermore, anti-malware strategies that leverage anti-virus, intrusion detection, and/or security information and event management (SIEM) correlation technologies may have little or no ability to identify whether certain managed hosts may be participating in an active botnet, wherein any system that operates or otherwise participates in a botnet should be considered fully compromised and a serious threat to an organization (e.g., because botnets can be exploited to introduce viruses or other malware into the network).

Consequently, although anti-malware technology may be generally available and essential to provide base security protection in a network, anti-malware technology cannot be considered foolproof and organizations must accept the fact that an infection will happen at some point. In fact, many organizations (especially those having large networks) routinely deal with daily infections despite prevalent anti-malware agents that seek to detect mutating threats and new hostile code types that can be introduced into a network. Even more worrisome may be the fact that many organizations with large networks have deliberately chosen to not use any anti-malware solution, much less a multi-layered anti-malware solution, instead relying on network security and system hardening. Accordingly, because the days when Internet-wide worms made front page news are long gone, a substantial need exists for a network security system that can leverage active and passive vulnerability discovery to identify malicious data on managed hosts in a network, detect participation in active botnets, and employ other techniques to protect a network against viruses and other malware without requiring resident anti-virus agents to be installed on the managed hosts.

SUMMARY OF THE INVENTION

According to one aspect of the invention, the system and method described herein may provide various mechanisms and techniques to leverage active network scanning and passive network monitoring to provide strategic anti-malware monitoring in a network. In particular, the system and method described herein may remotely connect to managed hosts in a network to compute hashes or other signatures associated with processes running thereon and suspicious files hosted thereon, wherein the hashes may communicated to a cloud database that aggregates all known virus or malware signatures that various anti-virus vendors have catalogued to detect malware infections without requiring the hosts to have a local or resident anti-virus agent. Furthermore, running processes and file system activity may be monitored in the network to further detect malware infections. Additionally, the network scanning and network monitoring may be used to detect hosts that may potentially be participating in an active botnet or hosting botnet content and audit anti-virus strategies deployed in the network.

According to one aspect of the invention, the system and method described herein may further have one or more active scanners communicate packets or other messages within the network to detect new or changed information describing various routers, hosts, servers, or other devices in the network. For example, in one implementation, the active scanners may perform credentialed audits or uncredentialed scans to scan the hosts, servers, or other devices in the network and obtain information that may then be analyzed to further identify potential vulnerabilities in the network. More particularly, in one implementation, the credentialed audits may include the active scanners using any suitable authentication technology to log into and obtain local access to the hosts, servers, or other devices in the network and perform any suitable operation that local users could perform thereon without necessarily requiring a local agent (although those skilled in the art will appreciate that a local agent may be used in certain implementations). Accordingly, the credentialed audits performed with the active scanners may be used to obtain highly accurate host-based data that includes various client-side issues (e.g., missing patches, operating system settings, locally running services, etc.), while the uncredentialed audits performed therewith may generally include network-based scans that involve communicating packets or messages to the hosts, servers, or other devices in the network and observing responses thereto in order to identify certain network vulnerabilities.

According to one aspect of the invention, the system and method described herein may have one or more passive scanners observe traffic traveling in the network to identify potential vulnerabilities in the network and detect activity that may potentially target or otherwise attempt to exploit vulnerabilities in the network. The passive scanners may generally observe the traffic traveling across the network to reconstruct one or more sessions occurring in the network, which may then be analyzed to identify potential vulnerabilities in the network and/or activity targeting the identified vulnerabilities. As such, the passive scanners may monitor the network in real-time to detect any potential vulnerabilities in the network, identify changes in the network, or otherwise provide visibility into the network and the activity that occurs therein. For example, in one implementation, the passive scanners may be deployed at a network hub, a spanned switch port, a network tap, a network choke point, a dial up node, a server farm, behind a firewall, or any other suitable location that enables the passive scanners to observe incoming and outgoing traffic in the network. In one implementation, the passive scanners may generally be deployed on any suitable server or other host in the network.

According to one aspect of the invention, the system and method described herein may use information that the passive scanners obtained from observing (or "sniffing") the traffic traversing the network in combination with information that the active scanners obtained in the credentialed audits and/or uncredentialed scans to build a topology or other suitable model describing the network. For example, in one implementation, the model built from the information obtained with the active scanners and the passive scanners may describe any routers, hosts, servers, or other devices detected or actively running in the network, any services or client-side software actively running or supported on the routers, hosts, servers, or other devices, and trust relationships associated with the various routers, hosts, servers, or other devices in the network, among other things. In one implementation, the passive scanners may further apply various signatures to the information in the observed traffic to identify network vulnerabilities, determine whether any data in the observed traffic potentially targets such vulnerabilities, build or update the network model, or otherwise obtain information that may be used to manage the network in response to any new or changed information in the network. Similarly, the active scanners may perform the credentialed audits and/or uncredentialed scans at periodic intervals, at scheduled times, or according to other criteria to further identify the network vulnerabilities, build or update the network model, or otherwise obtain information that may be used to manage the network based on a current state at the time when the active scanners performed the credentialed audits and/or uncredentialed scans.

According to one aspect of the invention, the system and method described herein may further have a management console in communication with the active and passive scanners, wherein the management console may provide a unified security monitoring solution to manage the vulnerabilities and the various routers, hosts, servers, or other devices in the network. In particular, the management console may aggregate the information obtained from the active scanners and the passive scanners to build or update the model associated with the network, which may generally include real-time information describing various vulnerabilities, applied or missing patches, intrusion events, anomalies, event logs, file integrity audits, configuration audits, or any other information that may be relevant to managing the vulnerabilities and assets in the network. As such, the management console may provide a unified interface to mitigate and manage governance, risk, and compliance across the network, and further to leverage the information obtained with the active and passive scanners to detect malware infections in the network without requiring that hosts managed therein have a local or resident anti-virus agent, to detect hosts that may potentially be participating in an active botnet or hosting botnet content, and to audit anti-virus strategies deployed in the network.

According to one aspect of the invention, the system and method described herein may further have a log aggregator receive events from various sources distributed across the network, including events generated by internal firewalls, external firewalls, routers, servers, devices, operating systems, applications, or any other suitable network source. In one implementation, the log aggregator may normalize the events contained in various logs received from the sources distributed across the network and aggregate the normalized events with information describing the network snapshot obtained with the active scanners and/or the network traffic observed with the passive scanners. Accordingly, the log aggregator may analyze and correlate events logged in the network with the information describing the observed network traffic and/or the information describing the network snapshot to automatically detect statistical anomalies, correlate the events with the vulnerabilities and assets in the network, search the analyzed and correlated information to identify events meeting certain criteria, or otherwise manage vulnerabilities and assets across the network. Furthermore, in one implementation, the log aggregator may filter the events, the information describing the observed network traffic, and/or the information describing the network snapshot to limit the information that the log aggregator normalizes, analyzes, and correlates to information relevant to a certain security posture. Alternatively (or additionally), the log aggregator may persistently save the events contained in all the logs to comply with regulatory requirements providing that all logs must be stored for a certain period of time. As such, the log aggregator may generally manage the various event logs, network snapshots, and/or observed network activity to comprehensively monitor, remediate, or otherwise manage vulnerabilities and assets in the network.

According to one aspect of the invention, the system and method described herein may therefore have the active scanners generally interrogate any suitable device in the network to obtain information describing a network snapshot at a particular point in time, the passive scanners continuously or periodically observe traffic traveling in the network to identify vulnerabilities, assets, or other information that further describes activity in the network, and the log aggregator collect additional information to further identify the vulnerabilities, assets, or other information describing the network. In one implementation, the management console may therefore collect or otherwise aggregate information obtained with the active scanners, the passive scanners, and the log aggregator and use the collected or aggregated information to generate, update, or otherwise manage models that describe topologies, vulnerabilities, assets, trust relationships, and other information associated with the network. For example, as summarized below and described in greater detail below with reference to the accompanying drawings and the following detailed description, the system and method described herein may use the active scanners, the passive scanners, the log aggregator, the management console, and/or other suitable components to implement various algorithms, techniques, capabilities, or other features that can leverage information discovered or otherwise obtained with the active scanners, the passive scanners, and the log aggregator to detect malware infections in the network without requiring that hosts managed therein have a local or resident anti-virus agent, to detect hosts that may potentially be participating in an active botnet or hosting botnet content, and to audit anti-virus strategies deployed in the network.

According to one aspect of the invention, an exemplary system that may be used to provide strategic anti-malware monitoring in a network may comprise one or more active scanners configured to remotely scan a host in the network to enumerate one or more processes running on the remotely scanned host and compute unique signatures associated with the one or more enumerated processes. Additionally, the system may comprise one or more processors coupled to the one or more active scanners, wherein the one or more processors may be configured to communicate the unique signatures associated with the enumerated processes running on the remotely scanned host to a cloud database that aggregates signatures associated with known virus or malware samples that multiple different anti-virus vendors have catalogued. In one implementation, the one or more processors may then receive a message from the cloud database, wherein the message may indicate whether the unique signatures associated with the enumerated processes running on the remotely scanned host match any signatures associated with the known virus or malware samples that the multiple different anti-virus vendors have catalogued. As such, in one implementation, the one or more processors may generate a report to indicate that the remotely scanned host has a malware infection if the message received from the cloud database indicates that the unique signature associated with at least one enumerated process running on the remotely scanned host matches the signature associated with at least one known virus or malware sample that the multiple different anti-virus vendors have catalogued.

According to one aspect of the invention, an exemplary method that may be used to provide strategic anti-malware monitoring in a network may comprise remotely scanning a host in the network to enumerate one or more processes running on the remotely scanned host and compute unique signatures associated with the one or more enumerated processes. In one implementation, the method may then communicate the unique signatures associated with the enumerated processes running on the remotely scanned host to a cloud database, which may aggregate signatures associated with known virus or malware samples that multiple different anti-virus vendors have catalogued. In one implementation, the method may further comprising receiving a message from the cloud database that indicates whether the unique signatures associated with the enumerated processes running on the remotely scanned host match any signatures associated with the known virus or malware samples that the multiple different anti-virus vendors have catalogued and generating a report to indicate that the remotely scanned host has a malware infection if the message received from the cloud database indicates that the unique signature associated with at least one enumerated process running on the remotely scanned host matches the signature associated with at least one known virus or malware sample that the multiple different anti-virus vendors have catalogued.

According to one aspect of the invention, an exemplary computer-readable storage medium that may be used to provide strategic anti-malware monitoring in a network may comprise computer-executable instructions that, when executed on one or more processors, cause the one or more processors to remotely scan a host in the network to enumerate one or more processes running on the remotely scanned host and compute unique signatures associated with the one or more enumerated processes and communicate the unique signatures associated with the enumerated processes running on the remotely scanned host to a cloud database, wherein the cloud database aggregates signatures associated with known virus or malware samples that multiple different anti-virus vendors have catalogued. Additionally, the computer-executable instructions, when executed on the one or more processors, may further cause the one or more processors to receive a message from the cloud database that indicates whether the unique signatures associated with the enumerated processes running on the remotely scanned host match any signatures associated with the known virus or malware samples that the multiple different anti-virus vendors have catalogued and generate a report to indicate that the remotely scanned host has a malware infection if the message received from the cloud database indicates that the unique signature associated with at least one enumerated process running on the remotely scanned host matches the signature associated with at least one known virus or malware sample that the multiple different anti-virus vendors have catalogued.

According to one aspect of the invention, the exemplary system, method, and computer-readable storage medium described above may therefore be used to detect that the remotely scanned host has the malware infection even if the remotely scanned host does not have a local or resident anti-virus agent (e.g., because the unique signatures associated with the enumerated processes running on the remotely scanned host, which may include cryptographic hashes or cryptographic checksums, provide sufficient information to test the enumerated running processes against any known virus or malware samples that the multiple different anti-vendors have catalogued using the cloud database alone). However, those skilled in the art will appreciated that, in certain implementations, the remotely scanned host may have a local or resident anti-virus agent, in which case testing the unique signatures associated with the enumerated processes running on the remotely scanned host may provide secondary virus or malware protection based on known virus or malware samples in addition to any known virus or malware samples that may be tested with the local or resident anti-virus agent. However, if any remotely scanned hosts have local or resident anti-virus agents, the anti-virus agents may be examined to audit an anti-malware strategy deployed in the network and report on whether the audited anti-malware strategy provides appropriate protection against virus or malware outbreaks in the network. Furthermore, in one implementation, the exemplary system, method, and computer-readable storage medium described above may upload a dissolvable agent to the remotely scanned host in order to remotely scan the host and thereby enumerate the running processes and compute the unique signatures associated therewith, wherein the dissolvable agent may subsequently be removed in response to the unique signatures associated with the enumerated processes having been communicated to the cloud database.

According to one aspect of the invention, the exemplary system, method, and computer-readable storage medium described above may further generate a report to indicate that one or more additional hosts in the network have the malware infection if the one or more additional hosts are running processes that have unique signatures matching the unique signature associated with the at least one enumerated process on the remotely scanned host that matched the signature associated with the at least one known virus or malware sample. Additionally, in one implementation, a file system associated with the remotely scanned host may be compared to a trusted file system known to have no malware infections to identify one or more suspicious files in the file system associated with the remotely scanned host. For example, in one implementation, the suspicious files may include one or more files that do not appear in the trusted file system or one or more files that have unique signatures that differ from corresponding files in the trusted file system. As such, in one implementation, the unique signatures associated with the identified suspicious files may be communicated to the cloud database that aggregates the signatures associated with the known virus or malware samples that the multiple different anti-virus vendors have catalogued and a report may be generated to indicate that the remotely scanned host has been infected with malware if the unique signature associated with at least one suspicious file on the remotely scanned host matches the signature associated with at least one known virus or malware sample that the multiple different anti-virus vendors have catalogued.

According to one aspect of the invention, the exemplary system, method, and computer-readable storage medium described above may further configure one or more passive scanners to observe connections in the network and identify one or more events and vulnerabilities potentially associated with a virus or malware outbreak in the network and query one or more logs that describe the connections observed with the one or more passive scanners and system processes that have occurred in the network in response to the report indicating that the remotely scanned host has the malware infection to isolate where the malware infection was introduced into the network and to evaluate the extent to which the malware infection has propagated or spread throughout the network. In one implementation, one or more events in the queried logs indicating that the virus or malware outbreak has potentially occurred in the network may be detected, wherein the detected events may relate to a host in the network running a new executable for the first time, a new executable running in the network for the first time, or a known executable being invoked in a new manner for the first time. As such, in one implementation, the cloud database may be queried in a similar manner to that described above, wherein a unique signature associated with the new executable or the known executable invoked in the new manner may be used to determine whether the detected events reflect an actual virus or malware outbreak in the network.

According to one aspect of the invention, the exemplary system, method, and computer-readable storage medium described above may further detect potential botnet activity or potential botnet participation in the network. For example, in one implementation, a network configuration associated with the remotely scanned host may be determined, wherein the determined network configuration may include an Internet Protocol (IP) address associated with the remotely scanned host and a Domain Name System (DNS) IP address used on the remotely scanned host. As such, the remotely scanned host may be determined to participate in an active botnet if the IP address associated therewith or the DNS IP address used thereon appears in a database that lists known botnet IP addresses. Furthermore, in one implementation, one or more active connections on the remotely scanned host may be enumerated and the remotely scanned host may be detected to participate in the active botnet if at least one active connection enumerated on the remotely scanned host has a source or destination IP address that appears in the database that lists the known botnet IP addresses. Further still, a web application on the remotely scanned host may be scanned to identify one or more external network addresses to which the scanned web application points, whereby the remotely scanned host may be determined to link to malicious content if at least one external network address to which the scanned web application points corresponds to an IP address that appears in the database that lists the known botnet IP addresses and/or a database that lists DNS names associated with known botnet activity. Additionally, various one or more logs that describe the connections observed in the network that are associated with potential botnet activity may be collected, wherein potential botnet activity may be detected if at least one connection observed in the network has a source or destination IP address or queries a DNS IP address that appears in the database that lists the known botnet IP addresses, in which case a report that describes the potential botnet activity and indicates whether the at least one connection associated with the potential botnet activity originated from a source IP address associated with a malicious botnet or an internal host that reached out to a destination IP address associated with the malicious botnet may be generated.

Other objects and advantages associated with the aspects and implements described herein will be apparent to those skilled in the pertinent art based on the accompanying drawings and the following detailed description.

DETAILED DESCRIPTION

Figure 1:
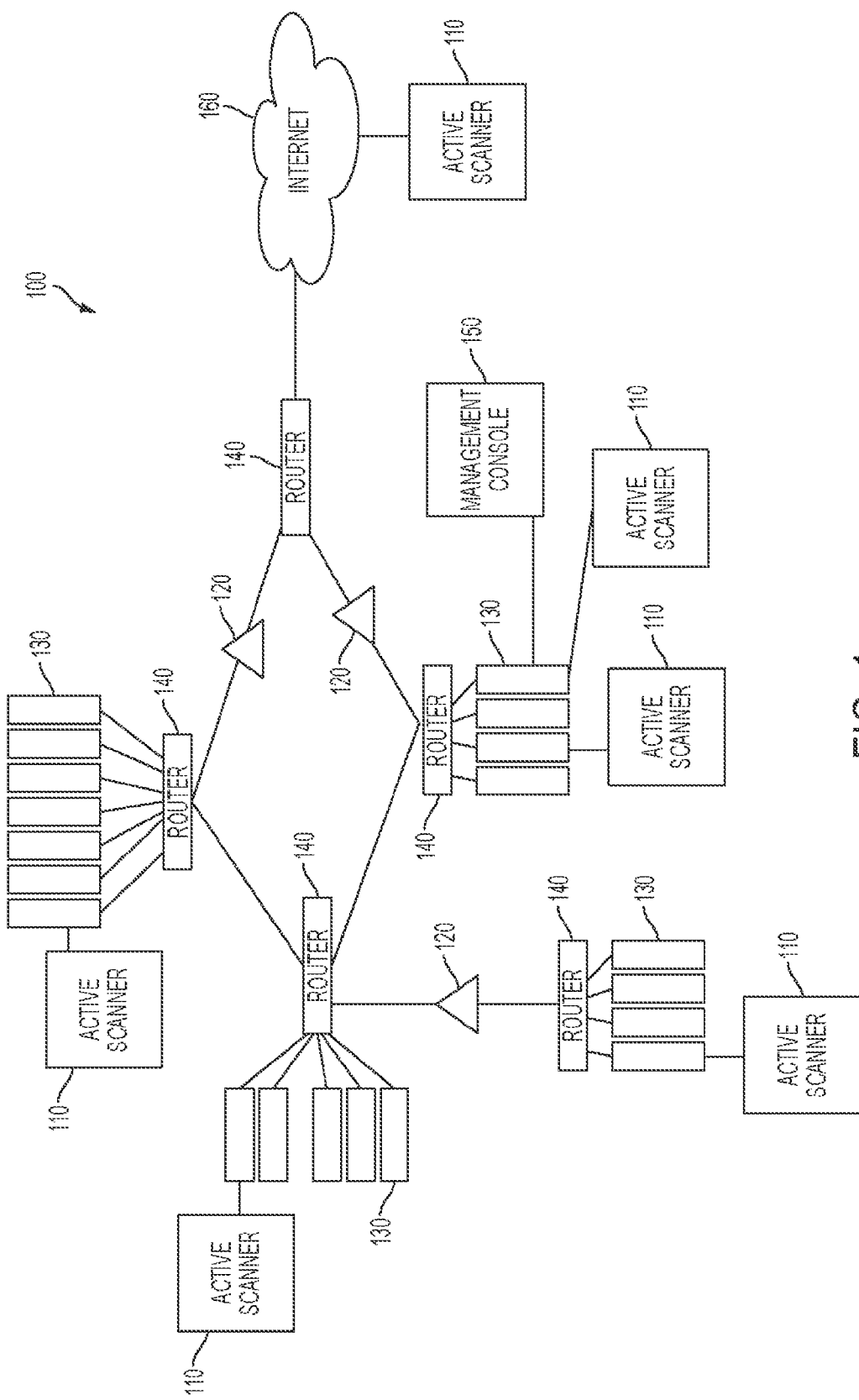
FIG. 1 illustrates an exemplary system that may be used to provide strategic anti-malware monitoring in a network, according to one aspect of the invention

According to one aspect of the invention, FIG. 1 illustrates an exemplary system 100 that may be used to provide strategic anti-malware monitoring in a network. In particular, the system 100 shown in FIG. 1 may generally include one or more active scanners 110 that can communicate packets or other messages within the network to detect new or changed information describing various routers 140, hosts 130, servers 130, or other devices 130 in the network. For example, in one implementation, the active scanners 110 may perform credentialed audits or uncredentialed scans to scan certain hosts 130, servers 130, or other devices 130 in the network and obtain information that may then be analyzed to identify potential vulnerabilities in the network. More particularly, in one implementation, the credentialed audits may include the active scanners 110 using suitable authentication technologies to log into and obtain local access to the hosts 130, servers 130, or other devices 130 in the network and perform any suitable operation that a local user could perform thereon without necessarily requiring a local agent. As such, the credentialed audits performed with the active scanners 110 may be used to obtain highly accurate host-based data that includes various client-side issues (e.g., missing patches, operating system settings, locally running services, etc.). On the other hand, the uncredentialed audits may generally include network-based scans that involve communicating packets or messages to the hosts 130, servers 130, or other devices 130 in the network and observing responses thereto in order to identify certain vulnerabilities (e.g., that a particular host 130 accepts spoofed packets that may expose a vulnerability that can be exploited to close established connections). Additionally, in one implementation, the system 100 may further include one or more passive scanners 120 that can observe traffic traveling in the network to further identify potential vulnerabilities in the network and detect activity that may potentially target or otherwise attempt to exploit the vulnerabilities that the active scanners 110 and/or the passive scanners 120 previously identified. In one implementation, the active scanners 110 may include Nessus® vulnerability and configuration assessment products, available from Tenable Network Security®, and the passive scanners 120 may include the Tenable Passive Vulnerability Scanner, also available from Tenable Network Security®.

In one implementation, as noted above, the active scanners 110 may obtain local access to hosts 130, servers 130, or other devices 130 in the network (e.g., credentialed audit) and/or communicate various packets or other messages within the network to illicit responses from the hosts 130, servers 130, or other devices 130 (e.g., in an uncredentialed scan). In contrast, the passive scanners 120 may generally observe (or "sniff") various packets or other messages in the traffic traversing the network to passively scan the network. In particular, the passive scanners 120 may reconstruct one or more sessions in the network from information contained in the sniffed traffic, wherein the reconstructed network sessions may then be used in combination with the information obtained with the active scanners 110 to build a model or topology describing the network. For example, in one implementation, the model or topology built from the information obtained with the active scanners 110 and the passive scanners 120 may describe any routers 140, hosts 130, servers 130, or other devices 130 detected or actively running in the network, any services or client-side software actively running or supported on the routers 140, hosts 130, servers 130, or other devices 130, and trust relationships associated with the various routers 140, hosts 130, servers 130, or other devices 130, among other things. In one implementation, the passive scanners 120 may further apply various signatures to the information in the observed traffic to identify network vulnerabilities and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to any new or changed information in the network.

In one implementation, as noted above, the passive scanners 120 may generally observe the traffic traveling across the network to reconstruct one or more sessions occurring in the network, which may then be analyzed to identify potential vulnerabilities in the network and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network). Accordingly, the passive scanners 120 may monitor the network in real-time to detect any potential vulnerabilities in the network in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network from the encrypted and interactive network sessions (e.g., a new e-commerce server 130 may be identified in response to the passive scanners 120 observing an encrypted and/or interactive session between a certain host located in a remote network 160 and a certain port on the server 130 that processes electronic transactions). In one implementation, the passive scanners 120 may observe as many sessions in the network as possible to provide optimal visibility into the network and the activity that occurs in the network. For example, in one implementation, the passive scanners 120 may be deployed at a network hub 140, a spanned switch port 140, a network tap 140, a network choke point 140, a dial up node 130, a server farm 130, behind a firewall, or any other suitable location that enables the passive scanners 120 to observe incoming and outgoing traffic in the network. In one implementation, the passive scanners 120 may generally be deployed on any suitable server 130 or other host 130 in the network that runs a suitable operating system (e.g., a Red Hat Linux or FreeBSD open source operating system, a UNIX, Windows, or Mac OS X operating system, etc.).

Furthermore, in one implementation, the system 100 shown in FIG. 1 may further include a management console 150 (e.g., Tenable SecurityCenter™, available from Tenable Network Security®), which may provide a unified security monitoring solution to manage the vulnerabilities and the various routers 140, hosts 130, servers 130, or other devices 130 in the network. In particular, the management console 150 may aggregate the information obtained from the active scanners 110 and the passive scanners 120 to build or update the model or topology associated with the network, which may generally include real-time information describing various vulnerabilities, applied or missing patches, intrusion events, anomalies, event logs, file integrity audits, configuration audits, or any other information that may be relevant to managing the vulnerabilities and assets in the network. As such, the management console 150 may provide a unified interface to mitigate and manage governance, risk, and compliance across the network. In one implementation, further detail relating to interaction between the management console 150, the active scanners 110, and the passive scanners 120 may be found in "Unified Security Monitoring (USM): Real-Time Situational Awareness of Network Vulnerabilities, Events and Configurations," the contents of which are hereby incorporated by reference in their entirety.

Figure 2:
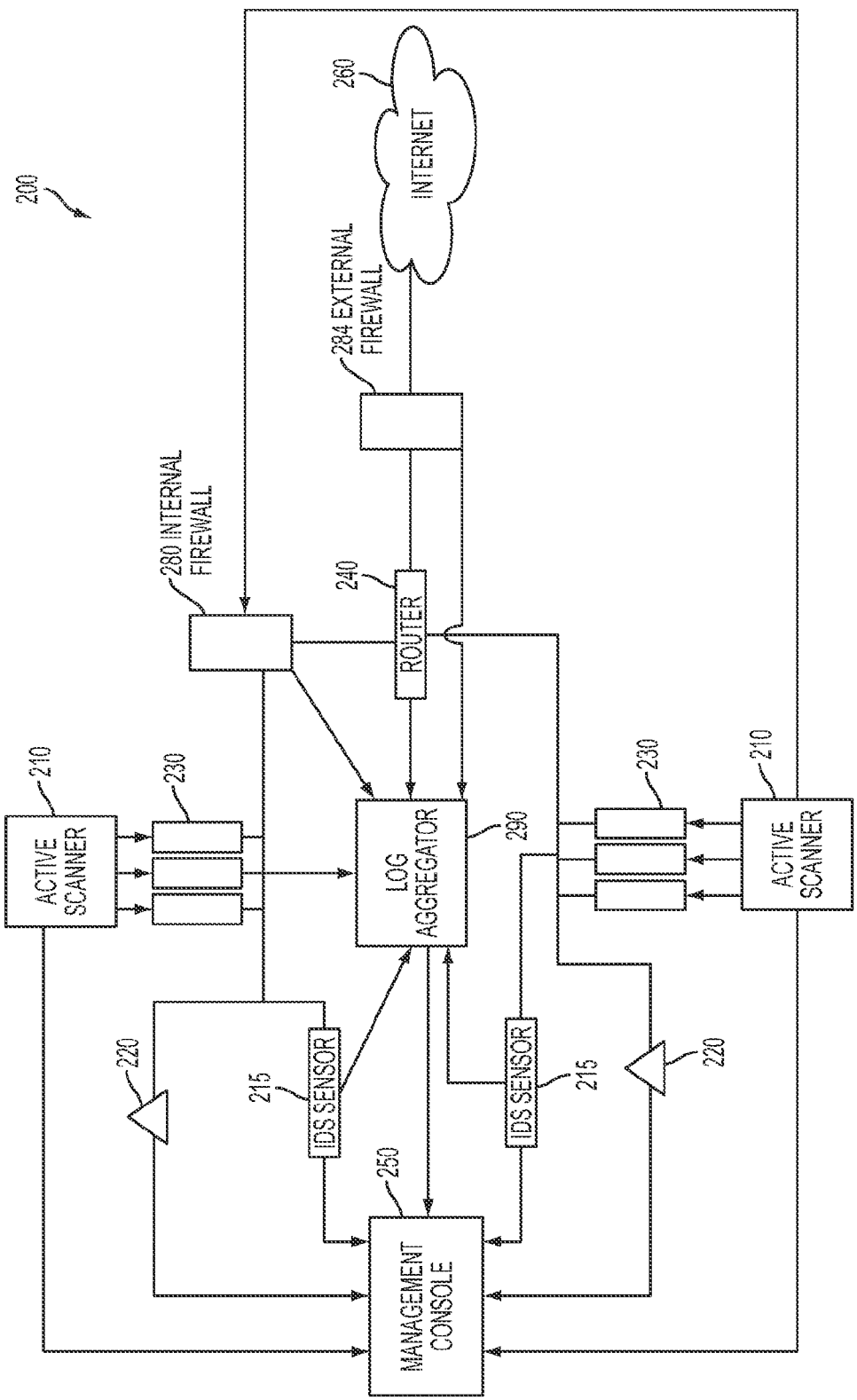
FIG. 2 illustrates another exemplary system that may be used to provide strategic malware monitoring in a network, according to one aspect of the invention

According to one aspect of the invention, FIG. 2 illustrates another exemplary system 200 that may be used to provide strategic anti-malware monitoring in a network. In particular, the system 200 shown in FIG. 2 may generally have various components and provide substantially similar functionality to the system 100 shown in FIG. 1 and described in further detail above. For example, in one implementation, the system 200 may include one or more active scanners 210, which may interrogate devices 230 in the network to build a model or topology of the network and identify various vulnerabilities in the network, one or more passive scanners 220 that can passively observe traffic in the network to further build the model or topology of the network, further identify vulnerabilities in the network, and detect activity that may potentially target or otherwise exploit the vulnerabilities. Additionally, in one implementation, the system 200 may further include a log aggregator 290 (e.g., the Tenable Log Correlation Engine, available from Tenable Network Security®), which may receive logs containing events from various sources distributed across the network. For example, in one implementation, the logs received at the log aggregator 290 may be generated by internal firewalls 280, external firewalls 284, routers 240, servers 230, devices 230, operating systems, applications, or any other suitable source in the network. Accordingly, in one implementation, the information obtained from the active scanners 210, the passive scanners 220, and the log aggregator 290 may be provided to the management console 250 to generate or update a comprehensive model describing topologies, vulnerabilities, assets, and other information associated with the network.

In one implementation, the active scanners 210 may be distributed in locations across the network to reduce stress on the network. For example, the active scanners 210 may be distributed at different locations in the network in order to scan certain portions of the network in parallel, whereby an amount of time to perform the active scans may be reduced. Furthermore, in one implementation, one or more of the active scanners 210 may be distributed at a location that provides visibility into portions of a remote network 260. For example, as shown in FIG. 1, one or more of the active scanners 210 may be distributed at a location in communication with a remote network 260, wherein the term "remote network" used herein may refer to the Internet, a partner network, or any other suitable external network. As such, the terms "remote network," "external network," "partner network," and "Internet" may all be used interchangeably to suitably refer to one or more outside networks, while references to "the network" and/or "the internal network" may generally refer to the areas that the systems and methods described herein may be used to protect or otherwise manage. Accordingly, in one implementation, limiting the portions in the network and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets (e.g., routers 240, internal firewalls 280, external firewalls 284, servers 230, hosts 230, devices 230, etc.). In particular, because the active scanners 210 may scan limited portions of the network rather than the entire network, and further because the parallel active scans may obtain information from the different portions of the network, the overall amount of time that the active scans consume may substantially correspond to the amount of time associated with one active scan.

As such, in one implementation, the active scanners 210 may generally scan the respective portions of the network to obtain information describing vulnerabilities and assets in the respective network portions. In particular, as described in "Unified Security Monitoring (USM): Real-Time Situational Awareness of Network Vulnerabilities, Events and Configurations," the contents of which are incorporated by reference above, the active scanners 210 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, in one implementation, the active scanners 210 may perform the various active probes to obtain a snapshot that describes assets actively running in the network at a particular point in time (e.g., actively running routers 240, internal firewalls 280, external firewalls 284, servers 230, hosts 230, etc.), wherein the snapshot may further include any exposures that the actively running assets to vulnerabilities identified in the network (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network. In one implementation, in response to obtaining the snapshot of the network, the active scanners 210 may then report the information describing the snapshot to the management console 250, which may use the information provided by the active scanners 210 to remediate and otherwise manage the vulnerabilities and assets in the network.

Furthermore, in one implementation, the passive scanners 220 may be distributed at various locations in the network to monitor traffic traveling across the network, traffic originating within the network and directed to the remote network 260, and traffic originating within the remote network 260 and directed to the network, thereby supplementing the information obtained with the active scanners 210. For example, in one implementation, the passive scanners 220 may monitor the traffic traveling across the network and the traffic originating from and/or directed to the remote network 260 to identify vulnerabilities, assets, or information from that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system sensor 215 identifies. In one implementation, the intrusion detection system may generally include an open source network intrusion prevention and detection system (e.g., Snort), a packet analyzer, or any other system that having a suitable sensor 215 that can detect and prevent intrusion or other security events in the network.

Thus, the passive scanners 220 may generally sniff one or more packets or other messages in the traffic traveling across, originating from, or directed to the network to identify new routers 240, internal firewalls 280, external firewalls 284, or other hosts 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network. In one implementation, the information that the passive scanners 220 obtains from sniffing the traffic traveling across, originating from, or directed to the network may therefore provide a real-time record describing the activity that occurs in the network. Accordingly, in one implementation, the passive scanners 220 may behave like a security motion detector on the network, mapping and monitoring any vulnerabilities, assets, services, applications, sensitive data, and other information that newly appear or change in the network. The passive scanners 220 may then report the information obtained from the traffic monitored in the network to the management console 250, which may use the information provided by the passive scanners 220 in combination with the information provided from the active scanners 210 to remediate and otherwise manage the network.

In one implementation, as noted above, the system 200 shown in FIG. 2 may further include a log aggregator 290, which may receive logs containing one or more events from various sources distributed across the network (e.g., logs describing network activity, operating system events, file modification events, USB device insertion events, etc.). In particular, the logs received at the log aggregator 290 may include events generated by one or more of the internal firewalls 280, external firewalls 284, routers 240, servers 230, devices 230, or other hosts 230 in the network in addition to events generated by one or more operating systems, applications, or other sources in the network. For example, in one implementation, the log aggregator 290 may normalize the events contained in the various logs received from the sources distributed across the network, and in one implementation, may further aggregate the normalized events with information describing the snapshot of the network obtained by the active scanners 210 and/or the network traffic observed by the passive scanners 220. Accordingly, in one implementation, the log aggregator 290 may analyze and correlate the events contained in the logs, the information describing the observed network traffic, and/or the information describing the snapshot of the network to automatically detect statistical anomalies, correlate intrusion events or other events with the vulnerabilities and assets in the network, search the analyzed and correlated information for data meeting certain criteria, or otherwise manage vulnerabilities and assets across the network.

Furthermore, in one implementation, the log aggregator 290 may filter the events contained in the logs, the information describing the observed network traffic, and/or the information describing the snapshot of the network to limit the information that the log aggregator 290 normalizes, analyzes, and correlates to information relevant to a certain security posture (e.g., rather than processing thousands or millions of events generated across the network, which could take a substantial amount of time, the log aggregator 290 may identify subsets of the events that relate to particular intrusion events, attacker network addresses, assets having vulnerabilities that the intrusion events and/or the attacker network addresses target, etc.). Alternatively (or additionally), the log aggregator 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). Thus, the log aggregator 290 may aggregate, normalize, analyze, and correlate information received in various event logs, snapshots obtained by the active scanners 210, and/or the activity observed by the passive scanners 220 to comprehensively monitor, remediate, and otherwise manage the vulnerabilities and assets in the network. Additionally, in one implementation, the log aggregator 290 may report information relating to the information received and analyzed therein to the management console 250, which may use the information provided by the log aggregator 290 in combination with the information provided by the passive scanners 220 and the active scanners 210 to remediate or otherwise manage the network.

Accordingly, in one implementation, the active scanners 210 may generally interrogate any suitable device 230 in the network to obtain information describing a snapshot of the network at any particular point in time, the passive scanners 220 may continuously or periodically observe traffic traveling in the network to identify vulnerabilities, assets, or other information that further describes the network, and the log aggregator 290 may collect additional information to further identify the vulnerabilities, assets, or other information describing the network. The management console 250 may therefore provide a unified solution that aggregates the vulnerability and asset information obtained by the active scanners 210, the passive scanners 220, and the log aggregator 290 to comprehensively manage governance, risk, and compliance across the network.

In one implementation, further detail relating to exemplary features associated with the systems shown in FIGS. 1 and 2 may be provided, for example, in U.S. patent application Ser. No. 10/863,238, entitled "System and Method for Managing Network Vulnerability Analysis Systems," which issued as U.S. Pat. No. 7,926,113 on Apr. 12, 2011, U.S. patent application Ser. No. 11/016,761, entitled "System and Method for Scanning a Network," which issued as U.S. Pat. No. 7,761,918 on Jul. 20, 2010, U.S. patent application Ser. No. 12/693,803, entitled "System and Method for Correlating Network Identities and Addresses," filed Jan. 26, 2010, U.S. patent application Ser. No. 12/695,659, entitled "System and Method for Enabling Remote Registry Service Security Audits," which issued as U.S. Pat. No. 8,302,198 on Oct. 30, 2012, U.S. patent application Ser. No. 12/729,036, entitled "System and Method for Passively Identifying Encrypted and Interactive Network Sessions," filed Mar. 22, 2010, U.S. patent application Ser. No. 12/775,120, entitled "System and Method for Three-Dimensional Visualization of Vulnerability and Asset Data," filed May 6, 2010, and U.S. patent application Ser. No. 13/403,108, entitled "System and Method for Using File Hashes to Track Data Leakage and Document Propagation in a Network," filed Feb. 23, 2012, the contents of which are each hereby incorporated by reference in their entirety.

Furthermore, as will be described in greater detail below with reference to FIGS. 3 through 5, the systems shown in FIGS. 1 and 2 may implement various algorithms or otherwise have various features and capabilities that may be used to leverage information discovered or otherwise obtained via the active scanners 210, the passive scanners 220, and the log aggregator 290 to monitor network security and compliance across multiple areas, including system inventories, vulnerabilities, and corporate policies in an end-to-end manner. For example, the various algorithms, features, and capabilities that will be described in further detail below may generally monitor system processes and traffic in the network, which may be correlated with audit results relating to anti-virus configurations and malware scans to validate and protect the network against malware infections at multiple levels and identify various threats to an organization (e.g., botnet participation, backdoor installations, etc.).

Figure 3:
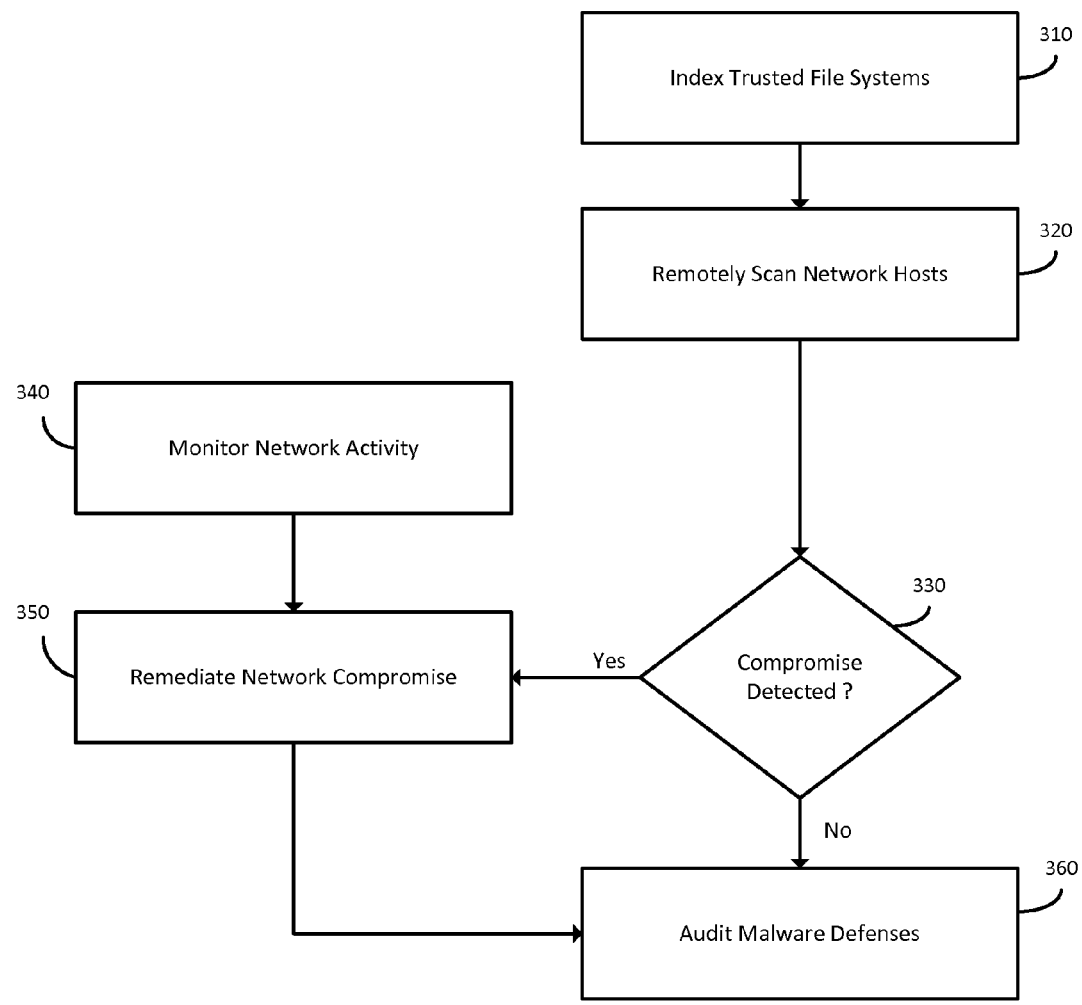
FIG. 3 illustrates an exemplary method that may be used to provide strategic anti-malware monitoring in a network, according to one aspect of the invention.

According to one aspect of the invention, FIG. 3 illustrates an exemplary method 300 that may be used to provide strategic anti-malware monitoring in a network, wherein the method 300 shown in FIG. 3 may generally use one or more low-latency third-party information feeds and leverage credentialed scans that may be performed with one or more active scanners to determine if any processes currently running on managed hosts in the network match known malware signatures, whether any managed hosts in the network may be participating in an active botnet, and/or audit anti-malware defenses that have been deployed in the network. In one implementation, as will be described in further detail herein, the method 300 shown in FIG. 3 may further utilize one or more passive scanners and a log aggregator to identify and determine how any detected malware infections first took hold in the network, the extent to which any detected malware infections may have propagated across the network, determine when malicious botnets scan the network or when internal hosts reach out to a botnet site, or otherwise provide forensic analysis and alerting relating to malware and botnet activity based on real-time traffic and system monitoring.

In one implementation, to provide the strategic anti-malware monitoring in the network, an operation 310 may include indexing one or more trusted file systems to create tables or manifests that list file hashes, file names, and paths associated with every file on one or more reference systems known to have no malware infections, wherein the file hashes may include cryptographic hashes, checksums, or other unique signatures associated with the files on the known reference systems. For example, in one implementation, the reference systems may include a clean system shipped from a suitable vendor that can be trusted to have no malware infections. In another example, the trusted file systems may correspond to computer systems that have been preconfigured to only include default operating system files, valid patches, and other files that are installed (or should be installed) on all devices in the network (e.g., a Windows 7 computer that information technology personnel preconfigured to only include default Windows 7 operating system files, valid Windows 7 patches, or other files associated with a default installation applicable to every device in the network).

As such, in one implementation, operation 310 may compute complete cryptographic hashes on every file on the known reference systems to index the trusted file systems associated therewith. However, those skilled in the art will appreciate that any suitable technique may be used to index the trusted file systems (e.g., based on file sizes and cryptographic hashes on beginning blocks, ending blocks, or other selected portions associated with the files in the trusted file systems, based on contents, attributes, or other properties associated with the files in the trusted file systems, etc.). In one implementation, the tables or manifests that list the file hashes, file names, and paths associated with the trusted file systems indexed in operation 310 may therefore describe a directory or folder structure that represent "ideal" or master sets that can be used to baseline subsequent comparisons used to detect whether viruses or other malware have infected the network. Furthermore, in response to scanning a certain host in the network and determining that the scanned host does not have any viruses or other malware infections, the file system associated with the scanned host may be indexed at that time to preserve a validated data set that can be referenced to subsequently audit or otherwise scan the host (e.g., identifying files on the host or processes running on the host that were not present or running at the time when the host was determined to have no infections, identifying files on the host or processes running on the host that have different signatures from the time when the host was determined to have no infections, etc.).

In one implementation, in response to suitably creating the tables or manifests to index the file hashes, file names, and paths associated with the trusted file systems, the active scanners may then scan various hosts in the network in an operation 320 to detect potential virus or malware infections on the scanned hosts. For example, in one implementation, the active scanners may perform a credentialed scan in operation 320 to inspect and enumerate all processes running on the scanned hosts and generate lists that include hashes corresponding to the enumerated processes, wherein the hashes corresponding to the enumerated processes may comprise MD5 checksums created with the Message-Digest Algorithm or other suitable data that can uniquely identify the enumerated processes. Further, in one implementation, the active scanners may compare current file systems associated with the scanned hosts to identify differences relative to the trusted file systems indexed in operation 310 (which may include previous file systems associated with the scanned hosts at an earlier time when the scanned hosts were baselined or otherwise profiled). Accordingly, in response to the active scanners identifying any identifying files on the scanned hosts that differ from the trusted file systems indexed in operation 310 or the previous file systems associated with the scanned hosts, operation 320 may further include the active scanners generating hashes corresponding to the differing files in to assess whether the differing files may be infected with viruses or malware.

In one implementation, in response to suitably generating the hashes that correspond to the enumerated processes running on the scanned hosts and the hashes that correspond to the files that differ from the trusted file systems, an operation 330 may include comparing the hashes generated in operation 320 to one or more third-party feeds that include all known malware signatures that one or more anti-virus vendors have catalogued to detect a potential network compromise relating to malware infections. Alternatively (or additionally), operation 330 may include encoding the generated hashes and proxying a query to a third-party malware hash provider to determine whether the generated hashes match any known malware signatures. In either case, operation 330 may therefore detect malware infections that may have resulted from failure in a specific anti-virus program (e.g., due to not having the most recent signature update) or gaps in coverage between different anti-virus vendors (e.g., because all running processes or suspicious files may be compared to an industry-wide index that lists all known malicious hashes that certain anti-virus vendors have catalogued and that other anti-virus vendors have not catalogued). Accordingly, the comparison performed in operation 330 to determine whether the running processes or suspicious files evidence potential virus or malware infections may provide secondary detection (i.e., over and above any anti-virus software that may be resident or otherwise installed on the scanned hosts) without having to run multiple anti-virus agents on the scanned hosts.

In one implementation, an operation 340 may further include the passive scanners and the log aggregator monitoring real-time traffic and system processes in the network in parallel (or in combination) with the scanning performed in operation 320 and the network compromise detection performed in operation 330. More particularly, to further assist the active scanners in protecting the network against viruses and other malware, the passive scanners may passively analyze traffic in the network in operation 340 to identify certain events and vulnerabilities that may be used to detect malware infections in the network and assess the extent to which any detected malware infections have compromised the network. For example, in one implementation, the events and vulnerabilities detected with the passive scanners may include, among other things, file browsing activity, Domain Name System (DNS) lookups, software protocols in use, agents or other plug-ins that users may have installed in web browsers, and potential policy violations. In one implementation, operation 340 may further include forwarding the network activity monitored with the passive scanners to the log aggregator, which may further collect logs that contain events describing activity and system processes from various hosts in the network (e.g., intrusion detection events, SSL certificates used in network conversations, file transfer activities, executable process invocations, unusual login behavior, USB device insertions, etc.).

Accordingly, as will be described in further detail below with reference to FIG. 4, an operation 350 may use the information obtained with the active scanners in operations 310 and 320 in combination the network activity monitored in operation 340 to remediate network compromises that arise from operation 330 detecting viruses or other malware in the network. For example, in one implementation, operation 350 may include generating a report that relates to any viruses or other malware infections that were detected in the network in operation 330, wherein the report may list the detected viruses or malware, the MD5 hash or checksum associated with the detected viruses or malware, information relating to when the viruses or malware was first detected, and the name assigned to the infection by each anti-virus vendor that has catalogued the detected viruses or malware, among other things. In addition, the MD5 hash or checksum associated with the detected viruses or malware may provide a seed that can be used to search other hosts in the network to assess the extent to which the viruses or malware have propagated throughout the network, whereby the compromise remediation performed in operation 350 may further include using the seed corresponding to the detected viruses or malware to search event logs, indices that represent file systems associated with scanned hosts, or other suitable data sources to detect other hosts that may be infected with the viruses or malware. Accordingly, the remediation operation 350 may be used to isolate where the viruses or other malware took hold in the network and where (or whether) the viruses or other malware have spread in the network to prevent further infection and assess strategies to prevent similar infections from happening in the future.

In one implementation, returning to operation 330, the information obtained with the active scanners in operations 310 and 320 may be further used to detect backdoors, default accounts, adware, peer-to-peer (P2P) software, and other high-profile infections or software that may be vulnerable to infection (e.g., Conficker, Stuxnet, Zeus, etc.). For example, in one implementation, operation 320 may include the active scanners performing a credentialed or authenticated scan that can access and inspect files on the target host to detect signs relating to compromise or malware, including the backdoors, default accounts, adware, P2P software, and other high-profile infections or software vulnerable to infection, and operation 320 may further access and inspect the target host to detect certain rootkits or default accounts that have been left on the target host and can be exploited to gain subsequent access thereto (e.g., D13HH, wh00t, etc.). As such, the comparison performed in operation 330 may generally complement the malware detection described above to determine whether any scanned hosts have running processes or suspicious files that evidence potential backdoors, default accounts, adware, P2P software, and other high-profile infections or vulnerable software that may be exploited to introduce malicious data into the network and thereby provide a further protection level over and above any anti-virus software that may be resident or otherwise installed on the scanned hosts. Furthermore, operation 340 may similarly include the passive scanners and the log aggregator monitoring the real-time traffic and system processes in the network to detect anomalous activity that may be exploiting backdoors, default accounts, adware, P2P software, or other high-profile infections or software vulnerable to introduce malicious data into the network, which may be used in combination with the detection performed in operation 330 to remediate network compromises that arise therefrom. For example, in one implementation, operation 350 may generate a report that details any suspicious software or content that can be exploited to introduce malicious data into the network. In addition, operation 350 may use MD5 hashes or checksums associated therewith to search other hosts in the network to assess the extent to which the backdoors, default accounts, adware, P2P software, or other known high-profile infections or vulnerable software may have spread throughout the network. Accordingly, the remediation operation 350 may further isolate where the backdoors, default accounts, adware, P2P software, or other known infections or vulnerable software took hold or otherwise spread through the network.

In one implementation, returning again to operation 330, the information obtained with the active scanners in operations 310 and 320 may be further used to detect botnet participation in the network. More particularly, as will be described in further detail below with reference to FIG. 5, botnet detection may be performed independently from any anti-virus, intrusion detection, event correlation, or other malware detection strategies to identify hosts in the network that may be participating in an active botnet. For example, a host that participates in an active botnet may be considered fully compromised and a serious threat to network security even if the host does not have any viruses or other malware infections (e.g., because the mere participation in the active botnet could be exploited to introduce viruses or other malware into the network or otherwise compromise the network). Accordingly, operation 330 may generally use a third-party information feed to identify hosts participating in an active botnet based on reputation and content scanning. For example, in one implementation, operation 330 may detect that a particular host participates in an active botnet if the host has a network address that appears in a database that lists known botnet addresses or visited an external network address that matches a DNS name or website associated with known botnet activity, if the host has inbound or outbound connections from other systems that participate in a known botnet and/or a DNS address that appears in a known botnet database listing.

Furthermore, in one implementation, operation 340 may further include the passive scanners and the log aggregator monitoring the real-time traffic and system processes in the network to further assist the active scanners in detecting botnet participation in the network, wherein the passive scanners may further passively analyze the traffic in the network in operation 340 to identify certain events and vulnerabilities that may relate to botnet activity. For example, in one implementation, the events and vulnerabilities that the passive scanners may detect in relation to potential botnet activity may include, among other things, network sessions that involve an internal host having a network address that appears in the database that lists known botnet addresses, an internal host that has visited an external network address that matches a DNS name or website associated with known botnet activity, an internal host that has inbound or outbound connections from other systems that participate in a known botnet, and/or an internal host that has a DNS address that appears in a known botnet database listing. Additionally, in one implementation, operation 340 may include the log aggregator correlating network activity monitored with the passive scanners and further network activity and system processes that may be described in intrusion logs, firewall logs, connection logs, NetFlow logs, authentication logs, or any other suitable data source that may describe activity and system processes in the network. As such, operation 340 may generally monitor the activity and system processes in the network to detect when malicious botnets scan the network and/or when internal hosts reach out to botnet sites, which may result in alerts based on directions and types associated with any connections that potentially involve malicious botnets (e.g., whether the connections are inbound or outbound, applications that were used to initiate connections to or from a known botnet address, etc.).

In one implementation, returning to operation 350, the information obtained with the active scanners in operations 310 and 320 and the network activity monitored in operation 340 may further be used to remediate network compromises that arise from operation 330 detecting botnet participation in the network. For example, in one implementation, operation 350 may include analyzing any botnet participation that was detected in operation 330 to identify the directions associated with connections to the detected botnet, internal network identifiers associated with the hosts participating in the botnet, and the applications that connected to the botnet, among other things. Additionally, in one implementation, operation 350 may include generating visualizations that represent botnet traffic in relation to the botnet participation detected in operation 330, wherein the visualizations may provide a three-dimensional diagram that shows the topology associated with the botnet and the connectivity to the hosts in the network that may be participating therein. Accordingly, the remediation operation 350 may further isolate the hosts associated with the detected botnet participation to prevent the botnet from introducing malicious data into the network or take other appropriate remedial action to prevent the botnet from otherwise compromising the network.

In one implementation, in response to having suitably assessed whether the network has been compromised in relation to any viruses, malware, backdoors, default accounts, adware, and/or botnet participation and appropriately remediating any detected network compromises, an operation 360 may then audit malware defenses in the network to strengthen protection against malware infections. For example, in one implementation, operation 360 may include the active scanners examining any anti-virus software deployed in the network to detect vulnerabilities associated therewith, including missing or outdated signatures associated with various anti-virus vendor technologies (e.g., Trend Micro, McAfee, ClamAV, Bitdefender, Kaspersky, ESET, F-Secure, etc.). Accordingly, auditing hosts in the network to assess whether anti-virus signatures are being properly updated may provide an additional protection level against malware infections. Additionally, in one implementation, operation 360 may include determining whether certain anti-virus vendor technologies are installed in the network, currently running in the network, configured to start after a host has booted up, or otherwise assessing the current anti-virus posture deployed in the network.

As such, operation 360 may perform various checks to ensure that any network-wide anti-virus strategy may be working in the manner expected to provide an appropriate defense against malware infections. For example, if operation 330 detected certain malware infections that arose from coverage gaps in which an anti-virus vendor technology deployed in the network has not catalogued the malware that was detected, operation 360 may alert appropriate personnel that protection may be improved if the deployed anti-virus vendor technology was replaced with another technology that has catalogued the detected malware (or alternatively the deployed anti-virus vendor technology may be automatically changed). Furthermore, those skilled in the art will appreciate various other remedial actions that may be taken in operation 360 to strengthen malware defenses based on the description provided above and the description that will be provided in further detail below with reference to FIG. 4 and FIG. 5 (e.g., updating any missing or outdated virus signature files, disabling network connectivity for hosts participating in active botnets, implementing policies to prevent connections directed to or originating from known botnet addresses, etc.).

Figure 4:
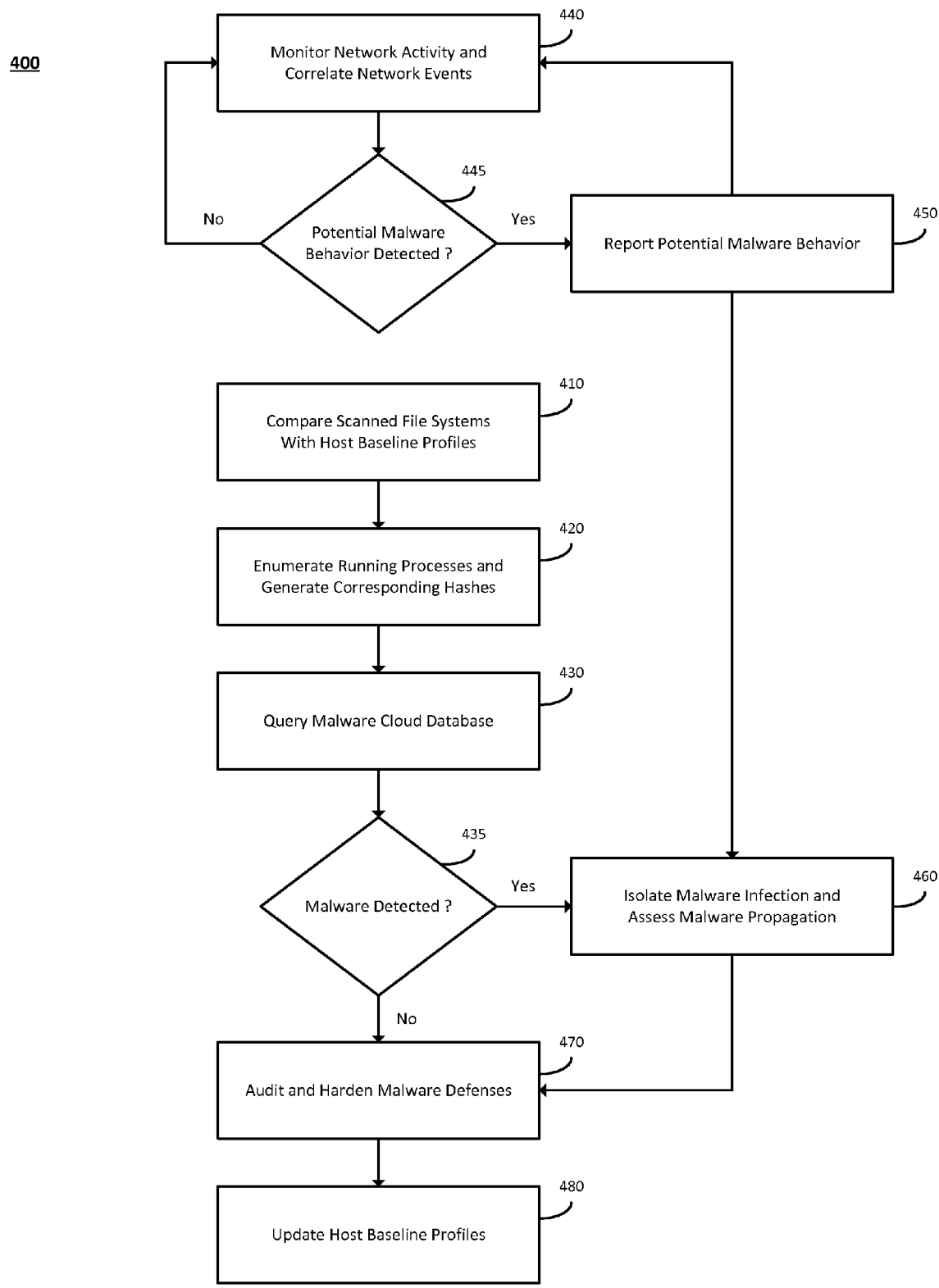
FIG. 4 illustrates an exemplary method that may be used to detect and remediate malware infections in a network and to audit and harden defenses deployed in the network to protect against malware infections, according to one aspect of the invention.

According to one aspect of the invention, FIG. 4 illustrates an exemplary method 400 that may be used to detect and remediate malware infections in a network and to audit and harden defenses deployed in the network to protect against malware infections. In particular, the method 400 shown in FIG. 4 may generally employ one or more low-latency data feeds that include malware information that various anti-virus vendors have catalogued and leverage credentialed scans and real-time network traffic and system process monitoring to detect potential virus or malware infections in the network. For example, in one implementation, one or more active scanners may initially authenticate to one or more hosts or other suitable scanning targets in the network in an operation 410 to conduct a credentialed scan that may be used to discover operating systems, applications, databases, configurations, running services, running processes, or any other suitable data associated with the scanning targets. Alternatively (or additionally), operation 410 may upload a dissolvable agent to the scanning targets, wherein the dissolvable agent may be installed thereon to execute a service that may discover the operating systems, applications, databases, configurations, running services, running processes, or other suitable data associated therewith. In one implementation, the active scanners or dissolvable agent may then access file systems associated with the scanning targets, which may be compared to one or more host baseline profiles. For example, as described above with reference to FIG. 3, the host baseline profiles may generally include tables or manifests created to index certain trusted file systems known to have no malware infections (e.g., clean systems that were initially shipped from vendors and can therefore be trusted to have no malware infections, preconfigured systems that only include certain default operating system files, valid patches, and other files initially installed on a suitable network host, earlier file system versions associated with certain scanning targets that were baselined and profiled at a time that the scanning targets had no malware infections, etc.).

As such, in one implementation, operation 410 may include identifying any differences between the file systems associated with the scanning targets and the host baseline profiles to identify suspicious files that may be further analyzed to determine whether the suspicious files correspond to potential viruses, malware infections, or other malicious data. In particular, the suspicious files identified in operation 410 may include any files that have the same name but different cryptographic hashes in the file systems associated with the scanning targets and the trusted file systems, files that only appear in the scanning target file systems, files that were not present or have different cryptographic hashes relative to earlier file system versions associated with the scanning targets, and/or files having cryptographic hashes that match known malware signatures described in the malware information data feeds. For example, operation 410 may identify malware that relates to known backdoors, default accounts, adware, P2P software, Trojan Horse programs, worm infections, rootkits, or other high-profile infections or suspicious content indicating that the scanning targets have potentially been left open for persistent access or otherwise compromised. In one implementation, in response to suitably identifying any suspicious files, software or other content in the file systems associated with the scanning targets, operation 410 may store cryptographic hashes that correspond thereto or otherwise flag the suspicious content for subsequent analysis, as will be described in further detail below.

In one implementation, an operation 420 may then include the active scanners or dissolvable agent inspecting the scanning targets to enumerate all processes running thereon and generate cryptographic hashes (e.g., MD5 checksums) that correspond to the enumerated running processes. For example, in one implementation, operation 420 may scan every port on the scanning targets to enumerate all executable processes running thereon rather than making any assumptions about certain ports (e.g., that certain ports may not be exploited to run malicious processes, that certain ports may be more easily exploited to run malicious processes, etc.). Accordingly, operation 420 may identify and generate cryptographic hashes corresponding to any and all executable processes running on the scanning targets to ensure that all potentially malicious executables will be detected. To that end, the cryptographic hashes corresponding to the enumerated executable processes running on the scanning targets may be encoded in an operation 430, wherein the encoded hashes corresponding to the enumerated executable processes may be used to query a cloud database that aggregates all known malware signatures that have been catalogued by one or more anti-virus vendors. For example, in one implementation, the cloud database may be associated with the network that includes the scanning targets or a third-party provider that maintains all known malware hashes or signatures that have been catalogued by one or more anti-virus vendors. In the latter case, an internal server associated with the network may proxy the query to the cloud database associated with the third-party provider. Additionally, in one implementation, operation 430 may further include encoding and using the hashes that correspond to any suspicious files that were identified in operation 410 to query the cloud database. In one implementation, in response to operation 430 suitably querying the cloud database, the active scanners may deauthenticate from the scanning targets to complete the credentialed scan. Furthermore, if the dissolvable agent was used to conduct the scans in operations 410 and 420, the dissolvable agent may be removed from the scanning targets to complete the scanning process.

In one implementation, an operation 435 may then receive a response to the query from the cloud database, wherein the response may identify any files or enumerated processes that have cryptographic hashes matching hashes or signatures associated with known malicious code. Accordingly, leveraging all known malware hashes or signatures aggregated on the cloud database in operations 430 may enable operation 435 to detect malware across multiple anti-virus vendor technologies, find malware infections that may have resulted from failure in a specific anti-virus vendor program (e.g., a deployed anti-virus vendor program having missing or outdated signatures), and close gaps that result from different anti-virus vendor technologies having different virus or malware signature coverage. Furthermore, leveraging the cloud database that maintains all known malware hashes or signatures may complement any existing anti-virus strategy (whether a standalone strategy or a layered strategy) without the need to deploy resident anti-virus agents or multiple anti-virus technologies because malware designed to escape detection with certain anti-virus technologies may be detected if at least one anti-virus technology in the industry can detect such malware. Additionally, in one implementation, operation 435 may identify any enumerated processes running on the scanning targets that match hashes corresponding to software that has been defined to violate one or more policies that control usage in the network, which may enable administrators to disable or uninstall software that does not match the security policies associated with the network.

In one implementation, one or more passive scanners and a log aggregator may monitor real-time traffic and system processes in the network in an operation 440, which may be conducted in parallel (or in combination) with the scanning performed in operation 410 through operation 435. More particularly, to further assist in protecting the network against viruses and other malware, the passive scanners may passively analyze traffic in the network in operation 440 to identify certain events and vulnerabilities that may be used to prove that malware has infected in the network and assess the extent to which any detected malware infections have compromised the network. For example, in one implementation, the events and vulnerabilities detected with the passive scanners may include, among other things, file browsing activity, Domain Name System (DNS) lookups, software protocols in use, agents or other plug-ins that users may have installed in web browsers, potential policy violations, SSL certificates used in network conversations, file transfers via Server Message Block (SMB), Network File System (NFS), File Transfer Protocol (FTP), and other protocols both inside and outside the network, internal network user identifiers associated with any such events or vulnerabilities (whether mobile or in dynamic DHCP environments), or other suitable events or vulnerabilities potentially associated with virus or malware outbreaks.

Furthermore, in one implementation, operation 440 may include the log aggregator gathering events that relate to system processes and other activities performed on various hosts in the network, including applications that are executed thereon. As such, in one implementation, the log aggregator may leverage the real-time traffic data monitored with the active scanners and the gathered events that relate to system processes and other activities performed in the network to generate alerts when certain key conditions potentially indicating a virus or malware outbreak occur in the network. For example, in one implementation, certain events that can potentially be associated with virus or malware outbreaks may include, among other things, a host running a new executable for the first time, a new executable running somewhere in the network for the first time, and/or a known executable being invoked in a new manner for the first time. Accordingly, in one implementation, the log aggregator may correlate events associated with the real-time traffic, system processes, and other activities performed in the network in an operation 445, which may be performed in a substantially continuous manner, at periodic intervals, or in response to other suitable criteria (e.g., in response to operation 435 determining that malware has been detected in the network to provide forensic analysis into infected systems and assess the extent to which the detected malware has infected or otherwise compromised the network). In one implementation, an operation 450 may therefore include reporting any potential malware behavior that was detected from correlating the events associated with the real-time traffic, system processes, and other activities performed in the network, which may be used in combination with operation 435 to isolate malware infections and assess whether or the extent to which malware has propagated throughout the network.

More particularly, in response to operation 435 detecting viruses or other malware in the network, an operation 460 may include generating a report that lists the viruses or other malware that was detected) the cryptographic hash or checksum associated with the detected viruses or malware, information relating to when the viruses or malware was first detected, and the name assigned to the infection by each anti-virus vendor that has catalogued the detected viruses or malware, among other things. For example, an exemplary report that can be generated in operation 460 to detail viruses or other malware may be shown below:

TABLE 1

Exemplary Malware Detection Report

| | |
|---|---|
| Name: | Malicious process detection |
| Synopsis: | Malicious processes have been detected on the remote host. |
| Description: | The MD5 checksums corresponding to one or more processes running on the remote host match known malware. |
| Solution: | Install or update the anti-virus software and remove the malware. |
| Risk Factor: | High |
| MD5: | 3d2003feeec75b7a7ca7e889553f61f1 |
| File Path: | C:\Users\Admin\Downloads\WinArpAttacker.exe |
| Process IDs: | 3024 |
| First Seen: | 2006-06-20 18:51:00+00:00 |
| Last Seen: | 2006-06-20 18:51:00+00:00 |
| File Size: | 279 KB |
| File Type: | PE32 executable for MS Windows (GUI) Intel 80386 32-bit |
| Last Scanned: | 2012-02-25 18:34:00+00:00 |
| Vendors Tested: | 25 |
| Vendors Reporting: | 21 |
| Detection Rate: | 84% |
| Anti-Virus Results: | The following anti-virus vendors consider this executable process malware and have provided the following names to catalogue this malware. |
| Antivir: | SPR/ArpAttacker.3020 |
| Avast: | Win32:ArpAttacker-B [Tool] |
| AVG: | — |
| BitDefender: | Trojan.Hacktool.ArpAttacker.H |
| CA: | — |
| ClamAV: | PUA.Packed.ASPack |
| DrWeb: | Tool.Arp |
| EsetNOD32: | Win32/HackTool.WinArpAttacker.A (Trojan) |
| Fortinet: | Malware_fam.gz |
| F-Prot: | W32/Trojan2.JTAZ |
| Ikarus: | HackTool.Win32.ArpAttacker.3020 |
| K7Computing: | Hacktool (000133f31) |
| McAfee: | Generic.dx (Trojan) |
| Microsoft: | PWS:Win32/Prast!rts |
| Norton: | W32/HackTool.PXM (Trojan) |
| Panda: | Hacktool/ArpAttacker (hacking tool) |
| QuickHeal: | Hacktool/ArpAttacker.3020.n6 (not a virus) |
| Rising: | — |
| Sophos: | Mal/Generic-L |
| Sunbelt: | HackTool.Win32.ArpAttacker.3020 (not malicious) |
| Symantec: | Hacktool |
| Trend Micro: | DIALER_PLAYGAMES |
| VBA32: | — |
| VirusBuster: | HackTool.ArpAttacker!Qdb/c0FG7e0 (Trojan) |
| Antivir Sig: | vdf_fusebundle.zip 2012-02-24 16:35:00+00 |

Accordingly, as shown in the exemplary report provided above, the MD5 checksum corresponding to the malicious process "WinArpAttacker.exe" has been determined to match the signature associated with known malware, wherein the "WinArpAttacker.exe" process was found on a particular host in the directory path "C:\Users\Admin\Downloads\" running under process identifier "3024." In addition to providing information relating to when the malicious process was first seen, last seen, and last scanner, the report further details the size and type associated with the malicious process, the anti-virus vendors that consider the process malware, the total anti-virus vendor sources that were tested, the percentage of the tested anti-virus vendor sources that consider the process malware (i.e., 21 out of 25, or 84%), and the names assigned to the process by those anti-virus vendors that consider the process malware.

In another example, in response to operation 435 detecting that the file system associated with a particular host scanned in operation 410 includes one or more files that may contain suspicious content (e.g., a Windows "host" file that has been modified to add alternate IP addresses, usually 0.0.0.0, to update sources associated with common anti-virus software to prevent the anti-virus software from correctly receiving updates), operation 460 may generate the following exemplary report to detail the detected suspicious content:

TABLE 2

Exemplary Suspicious Content Report

| | |
|---|---|
| Name: | Compromised Windows System (hosts File Check) |
| Synopsis: | The remote Windows host may be compromised. |
| Description: | The remote Windows host uses the file SYSTEM32\Drivers\etc\HOSTS to fix the name resolution of some sites like localhost or internal systems. Some viruses or spywares modify this file to prevent anti-virus or other security software that requires updating from working correctly. One or more suspicious entries in this file may prove that a malicious program has infected the remote host. |
| See also: | www.sophos.com/security/analyses/trojbagledll.html www.us-cert.gov/cas/techalerts/TA04-028A.html |
| Suspicious File: | C:\SYSTEM32\Drivers\etc\HOSTS |
| Suspicious Content: | The following suspicious entries were found in the "hosts" file: 91.206.201.9 intsecureprof.microsoft.com |
| Risk Factor: | Critical/CVSS Base Score: 10.0 |
| Solution: | Install or update the anti-virus software and remove any malicious software. |

Furthermore, in addition to reporting the viruses or malware that was detected in operation 435, operation 460 may further include isolating the viruses or malware infections and assessing where (or whether) the viruses or malware have propagated in the network. For example, in response to detecting the "WinArpAttacker.exe" malicious process in the example provided above, operation 460 may include searching various event logs, file systems, or other suitable sources in the network to identify any other hosts that are running or have run the same process in addition to other hosts that have the same process located in file systems associated therewith (whether or not the hosts have run the process). In one implementation, rather than using the name associated with the malicious process, the MD5 checksum may be used to identify other hosts that have been infected with the malicious process. For example, if the malware modifies an otherwise legitimate process without changing the name to escape detection, using the MD5 checksum may ensure that the malicious process will be detected rather than legitimate processes that share the same name (e.g., many viruses invoke "cmd.exe" to run various processes but many legitimate applications invoke "cmd.exe," meaning that a match in the malicious process name may not directly correlate with a virus infection, whereas using the checksum associated with an infected "cmd.exe" file may be used to detect other instances in which a host has an infected "cmd.exe" file). Additionally, in one implementation, operation 460 may include analyzing the network activity and system processes monitored in operation 440 and/or the potential malware behavior reported in operation 450 to identify certain events to provide forensic analysis into where and how the malicious process took hold and spread through the network. For example, in one implementation, operation 460 may identify errors, unusual login behaviors, USB device insertions, and other events related to the host on which the malicious process was detected to isolate how the malicious process entered the network and trace network traffic associated with the host on which the malicious process was detected and the hosts to which the malicious process spread and thereby map the manner in which the malicious process propagated in the network from one host to another.

In one implementation, in response to having suitably assessed whether the network has been compromised in relation to any viruses or other malware and appropriately isolating the malware infection and assessing the propagation associated therewith, an operation 470 may then audit and harden malware defenses in the network to strengthen protection against malware infections. For example, in one implementation, operation 470 may include the active scanners examining any anti-virus software deployed in the network to detect vulnerabilities associated therewith, including missing or outdated signatures associated with various anti-virus vendor technologies. Accordingly, auditing hosts in the network to assess whether anti-virus signatures are being properly updated may provide an additional protection level against malware infections. For example, if the host associated with the report shown above has a local anti-virus product from BitDefender, which has catalogued the malicious process that was detected under the name "Trojan.Hacktool.ArpAttacker.H," operation 470 may install current virus signatures associated with the BitDefender anti-virus product on the host to ensure that the appropriate protection level will be provided. In another example, if the host has a local anti-virus product from AVG, CA, Rising, or VBA32, which do not consider WinArpAttacker.exe malicious, operation 470 may replace the current anti-virus product on the host with another anti-virus product that would have detected the malicious process at the time that the process attempted to perform a file system write or execution to prevent infection in real-time. Additionally, in a similar respect, operation 470 may determine whether certain anti-virus vendor technologies are installed in the network, currently running in the network, configured to start after a host has booted up, or may otherwise assess and harden the current anti-virus posture deployed in the network (e.g., ensuring that each host in the network has been configured to run the correct anti-virus product defined in network policies and to run, auto-start, and auto-update the anti-virus product in a manner that complies with the network policies, that hosts have been secured to prevent or limit the impact that a successful virus compromise will have on the host and/or throughout the network, etc.).

In one implementation, an operation 480 may then update the host baseline profiles to appropriately reflect the results from the anti-malware analysis described above. For example, a particular host that was scanned and determined to have no infections may be baselined, whereby a subsequent anti-malware analysis need only inspect the host to identify changes from the baseline that represents a state when no infections were found. In this manner, the subsequent anti-malware analysis may be performed more efficiently to improve performance, response time, or other aspects associated with the anti-malware analysis.

Those skilled in the art will appreciate that the techniques described above in relation to the method 400 shown in FIG. 4 may be used to provide an anti-malware strategy that may protect the network against virus or other malware outbreaks in various ways. For example, in one implementation, the method 400 shown in FIG. 4 and described in further detail above may complement an existing anti-malware strategy that includes configuring hosts in the network to have local or resident anti-virus software, in which case the method 400 described above may be used to check whether the file systems associated with the hosts contain suspicious content and/or whether the hosts are running malicious processes against all known virus and malware samples at the time that the hosts are scanned, while the local or resident anti-virus software may detect file system writes and executions against virus and malware samples associated with a particular anti-virus vendor technology to prevent infections in substantially real-time. In this manner, the local or resident anti-virus software may provide baseline virus or malware detection against virus and malware samples associated with the particular anti-virus vendor technology, while the method 400 may provide secondary virus or malware detection against all known virus and malware samples that various different anti-virus vendor technologies have catalogued without requiring the hosts to run local or resident agents associated therewith.

Alternatively, in another implementation, the method 400 described above may provide a comprehensive stand-alone anti-malware strategy in which certain hosts or every host in the network may have no local or resident anti-virus software. In this case, the method 400 may be similarly used to check whether the file systems associated with the hosts that lack local or resident anti-virus software contain suspicious content and/or are running malicious processes against all known virus and malware samples at the time that the hosts are scanned. However, to further prevent infections in substantially real-time, the method 400 may be used to detect certain file system writes and executions or other anomalous behavior that may potentially lead to virus or malware outbreaks (e.g., in operations 440 and 445), which may trigger one or more actions to check the detected anomalous behavior against all known virus and malware samples at that time (e.g., when a host runs a new executable for the first time, when a new executable is run on the network for the first time, when a known executable has been invoked in a new manner for the first time, etc.). In this manner, the method 400 may use all known virus and malware samples that the various different anti-virus vendor technologies have catalogued to provide virus and malware detecting at multiple levels without requiring the hosts to run any local or resident anti-virus software.

Figure 5:
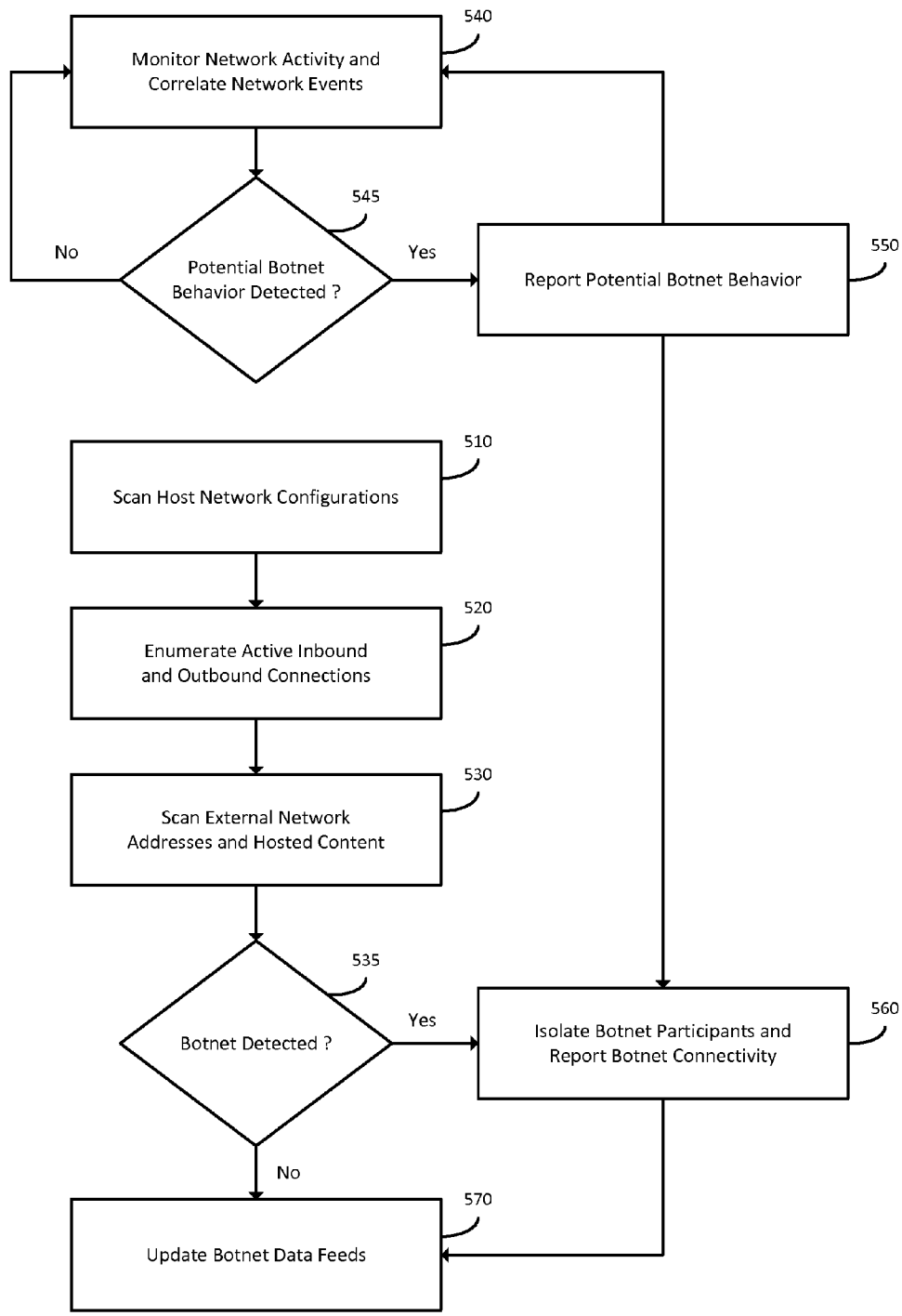
FIG. 5 illustrates an exemplary method that may be used to detect and remediate botnet participation in a network, according to one aspect of the invention.

According to one aspect of the invention, FIG. 5 illustrates an exemplary method 500 that may be used to detect and remediate botnet participation in a network. In particular, those skilled in the art will appreciate that various anti-malware and botnet-tracking vendors have indicated that botnets may account for millions or more hosts on the Internet, wherein a compromised host or system recruited or otherwise co-opted into botnet participation (often termed a "bot" or "zombie computer") has generally been infected with a malware distribution that cedes control thereof to a malicious party that can then direct the activities associated with the compromised host or system through standard network communication channels. In general, any particular host or system can be recruited or otherwise co-opted into botnet participation via executing malicious software on the host or system (e.g., via executing a malicious attachment downloaded to the host, exploiting web browser vulnerabilities, etc.). The executed malicious software then typically installs one or more modules to allow a botnet operator to command and control the infected host, spread the malicious modules, or perform other illicit activities (e.g., causing distributed denial-of-service attacks, installing adware or spyware, using fast flux DNS techniques to hide phishing and malware delivery sites behind compromised hosts that are dynamically changed to proxy the phishing and malware delivery, brute-forcing compromised hosts to run FTP, SMTP, SSH, or other exploitable services, etc.). In certain cases, the malicious software may be designed to self-delete after the malicious modules have been installed or only remain present to the extent needed to update and maintain the malicious modules, whereby the malicious software that recruited the host into the botnet may escape detection via conventional anti-virus software.

Accordingly, for at least the reasons noted above, any host or system that operates or otherwise participates in a botnet poses a serious threat to network security and should therefore be considered fully compromised. To that end, in order to detect and remediate botnet participation in the network, the method 500 shown in FIG. 5 and described in further detail herein may use one or more botnet data feeds containing reliable information that may be used to determine whether a particular host participates in an active botnet based on reputation and content scanning. More particularly, in one implementation, the method 500 may initially authenticate one or more active scanners to various hosts or other suitable scanning targets in the network to conduct a credentialed scan to obtain data from the scanning targets that may potentially indicate that the scanning targets participate in a known botnet. Alternatively (or additionally), the method 500 may initially upload a dissolvable agent to the scanning targets, wherein the dissolvable agent may be installed on the scanning targets to execute a service that may obtain the data that may potentially indicate botnet participation.

In one implementation, whether the method 500 uses the active scanners to remotely conduct the credentialed scan or the dissolvable agent to locally inspect the scanning targets, an operation 510 may include obtaining network configurations associated with the scanning targets. For example, in one implementation, the network configurations obtained in operation 510 may include an IP address or other suitable network address associated with the scanning targets, a DNS IP address, DNS server name, or other suitable DNS server settings used on the scanning targets, or any other suitable network configurations that may be exploited or infected to recruit or co-opt the scanning targets into botnet participation.

In one implementation, an operation 520 may use the active scanners or the dissolvable agent to enumerate all active inbound and outbound connections associated with the scanning targets. For example, in one implementation, the active inbound and outbound connections may be enumerated based on netstat connection information that may describe permanent connections on the scanning targets, current connections on the scanning targets at a particular point in time (e.g., during the scan), and certain ports permanently or currently open on the scanning targets (e.g., every open port on the scanning targets, certain ports commonly used in botnet traffic or malicious network activity, etc.). Furthermore, in one implementation, operation 520 may obtain network addresses or other suitable network settings associated with the enumerated inbound and outbound connections (e.g., a source IP address associated with a host making an inbound connection to a particular scanning target, a destination IP address to which the scanning target has initiated an outbound connection, etc.).

In one implementation, an operation 530 may further use the active scanners or the dissolvable agent to conduct a web application scan on the scanning targets. In particular, many web applications may have custom code designed to interact with operating systems, backend systems, SQL databases, users, and other network resources. As such, vulnerabilities that relate to cross-site scripting (XSS), SQL injection, HTTP header injection, directory traversal, remote file inclusion, and remote command execution may potentially exploit web applications to recruit or otherwise co-opt the scanning targets into participating in an active botnet because the web applications may establish trust relationships that may potentially grant exploitable privileges (e.g., administrator or unrestricted access) to the machine hosting the web application resources. As such, in one implementation, operation 530 may conduct the web application to list external URLs, links, or other network addresses pointed to with any web applications hosted on the scanning targets and further to identify content that may be hosted on the scanning targets via the web applications. For example, XSS generally relates to a code injection flaw that allows attackers to inject arbitrary script code into a web page that may be executed according to a trusted security relationship, which can be exploited to redirect authentication credentials or other trusted data to an external network address that may be a botnet participant. In another example, remote file inclusion relates to a cross-server attack that may manipulate a web application to load executable content from third-party servers, which may allow attackers to execute arbitrary commands with the privileges associated with the targeted machine or server hosting the web application. Accordingly, operation 530 may generally identify the external URLs, links, or other network addresses pointed to with any web applications hosted on the scanning targets and identify hosted content associated with any web applications on the scanning targets to check whether the web applications may have been exploited to recruit or otherwise co-opt the scanning targets into botnet participation.

In one implementation, an operation 535 may then analyze the network configurations obtained in operation 510, the active inbound and outbound connections enumerated in operation 520, and the external network addresses and hosted content identified in the web application scan conducted in operation 530 to determine whether any scanning targets associated therewith may be participating in active botnet. For example, in one implementation, operation 535 may determine that a particular scanning target may be participating in active botnet if the scanning target has an IP address that matches any IP addresses in a database that lists known botnet IP addresses, which may indicate that the scanning target has been infected and can be used to attack other internal or third-party hosts or otherwise conduct illicit activities. In another example, operation 535 may determine that the scanning target may a botnet participant if the scanning target has been configured with a DNS IP address corresponding to a DNS server in a database that lists known botnet systems, which may indicate that the scanning target has been compromised and may potentially route requests directed to legitimate websites and hostnames to attacker-controlled botnet machines. Furthermore, operation 535 may detect botnet participation if the scanning target has an active inbound or outbound connection with a host having an IP address that matches any IP addresses in the database that lists the known botnet IP addresses, which may indicate connectivity between the scanning target and the botnet, or if any external network addresses identified in the web application scan match DNS names or websites associated with known botnet activity or any hosted content identified therein has been used in known botnet activity or matches signatures associated with known malicious content (which may be determined using substantially similar techniques to those described above in relation to FIG. 4).

In one implementation, in addition to the mechanisms described above to detect potential botnet participation with the active scanners and/or dissolvable agents, an operation 540 may include one or more passive scanners and a log aggregator monitoring real-time traffic and system processes in the network in parallel for in combination) with the botnet detection performed with the active scanners and/or dissolvable agents. More particularly, the passive scanners may passively observe traffic in the network in operation 540 to identify certain events and vulnerabilities that may be used to detect potential botnet behavior in substantially real-time. For example, in one implementation, the passive scanners may observe all inbound and outbound connections in the network, which may encompass all web queries, DNS queries, file transfers (e.g., via FTP, SMB, NFS, HTTP, etc.), and remote service executions (e.g., SSH, VNC, Windows Terminal, Windows Remote Desktop, etc.). Additionally, the passive scanners may obtain source and destination IP addresses, IP protocols, source and destination ports associated with any UDP or TCP traffic, IP service types, and/or other suitable data that may describe the observed connections. Furthermore, in one implementation, the log aggregator may collect various logs that may contain events or other data that may relate to system processes or other network activity that may reflect botnet behavior (e.g., SYSLOG messages that describe to the inbound and outbound connections observed with the passive scanners in addition to intrusion logs, firewall logs, connection logs, NetFlow logs, authentication logs, etc.).

In one implementation, the log aggregator may then correlate the various collected logs to detect whether the events or other data contained therein potentially reflects botnet behavior in an operation 545, wherein the log aggregator may report any potential botnet behavior that was detected in an operation 550. For example, in one implementation, the log aggregator may maintain a "threatlist" that includes IP addresses, domains, or other suitable data to identify systems known to participate in an active botnet or otherwise known to have a hostile reputation (e.g., due to possible botnet participation). In other examples, the log aggregator may detect potential botnet behavior based on login failures to various applications (e.g., VPN applications, Secure Shell daemons, Windows authentication, etc.), web access and error logs from web servers (e.g., Apache, IIS, etc.), and intrusion events, among other things. In one implementation, in response to detecting potential botnet behavior in operation 545, the potential botnet behavior reported in operation 550 may describe the monitored network traffic or system processes associated therewith in addition to directions and types associated with any connections in which the potential botnet behavior occurred. In this manner, the potential botnet behavior reported in operation 550 may appropriately generate alerts that indicate when a malicious botnet has scanned the network, which may indicate various botnet scanning, attack, and compromise attempts, and may further generate appropriate alerts to indicate when an internal host in the network has reached out to a malicious botnet, which may indicate that the internal host has been "botted" or otherwise compromised.

In one implementation, in response to operation 535 detecting potential botnet participation in the network and/or operation 550 reporting potential botnet behavior based on monitored network activity and system processes, an operation 560 may attempt to isolate any internal hosts that may be have been recruited or otherwise co-opted into the botnet participation and further isolate the network from any external hosts associated with the botnet (e.g., to prevent the botnet from spreading malicious data throughout the network or otherwise using the network to spread malicious data to conduct illicit activities). Additionally, in one implementation, operation 560 may report the botnet connectivity detected in operation 535 and/or reported in operation 550. For example, in one implementation, the botnet connectivity reported in operation 560 may include a three-dimensional visualization that shows the topology and/or traffic associated the botnet, which may include the topology associated with all known internal and external hosts participating therein and/or the botnet traffic attributable to each botnet participant (e.g., using techniques described in U.S. patent application Ser. No. 12/775,120, entitled "System and Method for Three-Dimensional Visualization of Vulnerability and Asset Data," filed May 6, 2010, the contents of which are incorporated by reference above). Alternatively (or additionally), operation 560 may generate a text-based report to detail the detected botnet connectivity, with an exemplary report that can be generated in operation 560 shown below:

TABLE 3

Exemplary Botnet Detection Report

| | |
|---|---|
| Name: | Host Listed in Known Bot Database |
| Synopsis: | According to a third-party database, the remote host has an IP address listed in a known botnet. |
| Description: | The remote host has an IP address listed in a known botnet database, which means that the remote host has been infected and can be used to attack third-party hosts and/or conduct illicit activities. |
| Solution: | Reinstall the remote system from scratch. |
| Risk Factor: | High |
| Exploitable: | False |

TABLE 3-continued

Exemplary Botnet Detection Report

| | |
|---|---|
| Name: | DNS Server Listed in Known Bot Database |
| Synopsis: | According to a third-party database, the remote host uses a DNS server listed in a known botnet. |
| Description: | The remote host uses one or more DNS servers listed in a public botnet database, which could cause requests for legitimate websites and hostnames to be routed to attacker-controlled machines. This also suggests that the remote host may have been compromised. |
| Solution: | Investigate the DNS server settings and reinstall the remote system from scratch if appropriate. |
| Risk Factor: | None |
| Exploitable: | False |
| Name: | Active Connection with Host Listed in Known Bet Database |
| Synopsis: | According to a third-party database, the remote host is receiving an inbound connection from a host listed in a known botnet and/or making an outbound connection to a host listed in a known botnet. |
| Description: | According to the netstat output, the remote host has an inbound connection from and/or an outbound connection to one or more host listed in a known botnet. |
| Solution: | Determine which services the botnet hosts are connected to and investigate further, if necessary. |
| Risk Factor: | None |
| Exploitable: | False |
| Name: | Website Links to Malicious Content |
| Synopsis: | The remote website contains links pointing to known malware sites. |
| Description: | The website contains malicious links listed in public malware databases. Either website users created the links (e.g., comments added to a blog post) or the website has been compromised. |
| Solution: | Remove the faulty links. |
| Risk Factor: | None |
| Exploitable: | False |

In one implementation, an operation 570 may then update the botnet data feeds that were used to detect the potential botnet participants and/or botnet behavior (e.g., the "threatlist" used in the log aggregator, the databases that list the known botnet systems, etc.). For example, in one implementation, one or more third-parties may periodically update and publicly distribute known botnet data, which may be used to update the botnet data feeds. Furthermore, in one implementation, operation 570 may report any internal hosts that were detected to participate in known botnets and/or any internal hosts that were previously botnet participants and appropriately remediated to terminate the botnet connectivity to the third parties, which may ensure that the publicly distributed data will be accurate. In this manner, subsequent botnet detection performed with the method 500 described above may be guaranteed to always use the most accurate and updated botnet data feeds.

Those skilled in the art will appreciate that the techniques described above in relation to FIG. 5 may be performed at any suitable time to detect potential botnet participation in the network. For example, in one implementation, a network that does not have the passive scanners, the log aggregator, or another mechanism to monitor network traffic to detect potential botnet activity in real-time may schedule credentialed scans via one or more active scanners several times a day to generate appropriate alerts if any hosts are found with a botnet connection, in which case operations 540, 545, and 550 would not be performed. Alternatively, in one implementation, the method 500 may be performed to conduct botnet scanning with the active scanners or another suitable scanning service on a daily basis to identify infected systems or web servers that may be hosting botnet content, while one or more passive scanners, log aggregators, or other monitoring mechanism may observe network traffic in substantially real-time to close coverage gaps that may arise if botnet activity occurs between the daily scans. In any case, the botnet detection techniques provided in FIG. 5 may be used independently from any anti-virus, intrusion detection, or event correlation mechanisms that otherwise protect a network against virus or malware outbreaks because compromised hosts that are participating in botnet activity may not necessarily have any malicious content hosted thereon or run any malicious processes that match known malware signatures. Indeed, in many cases, botnet traffic can be designed to exploit certain vulnerabilities or run certain legitimate processes to conduct illegitimate activities without necessarily relying on malicious code (e.g., if malicious code was removed after being used to gain privileged access to a compromised host, merely seeking to detect the malicious code would allow the botnet operator to escape detection and continue to exploit the privileged access).

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence, and to the extent that the above disclosure describes certain exemplary aspects or implementations using singular forms (e.g., "a," "an," "the," etc.), such singular forms will be understood to further include plural forms unless clearly indicated otherwise. Those skilled in the pertinent art will further appreciate that the terms "comprises," "comprising," "includes," and/or "including" specify that the features, structures, or characteristics are present in the associated aspects and implementations but do not preclude the one or more other features, structures, or characteristics from being present or added to the associated aspects and implementations.

Furthermore, aspects and implementations may be described in the above disclosure as including particular features, structures, or characteristics, but it will be apparent that every aspect or implementation may or may not necessarily include the particular features, structures, or characteristics, and moreover, well-known features, structures, or characteristics associated with the aspects and implementations described above may be described in general terms or omitted to avoid obscuring the relevant details associated with the aspects and implementations described above. Further, where particular features, structures, or characteristics have been described in connection with a specific aspect or implementation, it will be understood that such features, structures, or characteristics may be included with other aspects or implementations, whether or not explicitly described. In addition, alternate aspects and implementations may be apparent to those skilled in the pertinent art based on the above disclosure, wherein such alternate aspects and implementations may be constructed and practiced without departing from the scope or spirit of the invention. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for strategic anti-malware monitoring in a network, comprising:
   one or more active scanners configured to remotely scan a host in the network to enumerate one or more processes running on the remotely scanned host and compute unique signatures associated with the one or more enumerated processes; and
   one or more processors coupled to the one or more active scanners, wherein the one or more processors are configured to:
      communicate the unique signatures associated with the enumerated processes running on the remotely scanned host to a cloud database, wherein the cloud database aggregates signatures associated with known virus or malware samples that multiple different anti-virus vendors have catalogued;
      receive a message from the cloud database that indicates whether the unique signatures associated with the enumerated processes running on the remotely scanned host match any signatures associated with the known virus or malware samples that the multiple different anti-virus vendors have catalogued; and
      generate a report to indicate that the remotely scanned host has a malware infection if the message received from the cloud database indicates that the unique signature associated with at least one enumerated process running on the remotely scanned host matches the signature associated with at least one known virus or malware sample that the multiple different anti-virus vendors have catalogued.

2. The system recited in claim wherein the remotely scanned host does not have a local or resident anti-virus agent.

3. The system recited in claim 1, wherein the unique signatures associated with the enumerated processes running on the remotely scanned host include cryptographic hashes or cryptographic checksums.

4. The system recited in claim 1, wherein the one or more active scanners are further configured to:
   upload a dissolvable agent to the remotely scanned host to enumerate the one or more processes running thereon and compute the unique signatures associated therewith; and
   remove the dissolvable agent from the remotely scanned host subsequent to the one or more processors communicating the unique signatures associated with the enumerated processes to the cloud database.

5. The system recited in claim 1, wherein the one or more processors are further configured to generate a report to indicate that one or more additional hosts in the network have the malware infection if the one or more additional hosts are running processes that have unique signatures matching the unique signature associated with the at least one enumerated process on the remotely scanned host that matched the signature associated with the at least one known virus or malware sample.

6. The system recited in claim 1, wherein the one or more active scanners are further configured to:
   compare a file system associated with the remotely scanned host to a trusted file system known to have no malware infections; and
   identify one or more suspicious files in the file system associated with the remotely scanned host, wherein the one or more suspicious files do not appear in the trusted file system or have unique signatures that differ from corresponding files in the trusted file system.

7. The system recited in claim 1, wherein the one or more processors are further configured to:
   communicate the unique signatures associated with the one or more suspicious files to the cloud database that aggregates the signatures associated with the known virus or malware samples that the multiple different anti-virus vendors have catalogued; and
   generate a report to indicate that the remotely scanned host has been infected with malware if the unique signature associated with at least one suspicious file on the remotely scanned host matches the signature associated with at least one known virus or malware sample that the multiple different anti-virus vendors have catalogued.

8. The system recited in claim 1, further comprising:
   one or more passive scanners configured to observe connections in the network to identify one or more events and vulnerabilities potentially associated with a virus or malware outbreak in the network; and
   a log aggregator configured to:
      collect one or more logs that describe the connections observed with the one or more passive scanners and system processes that have occurred in the network; and
      query the one or more collected logs in response to the report indicating that the remotely scanned host has the malware infection to isolate where the malware infection was introduced into the network and to evaluate the extent to which the malware infection has propagated or spread throughout the network.

9. The system recited in claim 8, wherein the log aggregator is further configured to:
   detect one or more events in the collected logs indicating that the virus or malware outbreak has potentially occurred in the network, wherein the one or more detected events include one or more of a host in the network running a new executable for the first time, a new executable running in the network for the first time, or a known executable, being invoked in a new manner for the first time; and query the cloud database using a unique signature associated with the new executable or the known executable invoked in the new manner to determine whether the one or more detected events reflect an actual virus or malware outbreak in the network.

10. The system recited in claim 1, wherein the one or more active scanners are further configured to:
   determine a network configuration associated with the remotely scanned host, wherein the determined network configuration includes an Internet Protocol (IP) address associated with the remotely scanned host and a Domain Name System (DNS) IP address used on the remotely scanned host; and
   detect that the remotely scanned host participates in an active botnet if the IP address associated therewith or the DNS IP address used thereon appears in a database that lists known botnet IP addresses.

11. The system recited in claim 1, wherein the one or more active scanners are further configured to:
   enumerate one or more active connections on the remotely scanned host; and
   detect that the remotely scanned host participates in an active botnet if at least one active connection enumerated on the remotely scanned host has a source or destination Internet. Protocol (IP) address that appears in a database that lists known botnet IP addresses.

12. The system recited in claim 1, wherein the one or more active scanners are further configured to:
   scan a web application on the remotely scanned host to identify one or more external network addresses to which the scanned web application points; and
   detect that the remotely scanned host links to malicious content if at least one external network address to which the scanned web application points corresponds to an Internet. Protocol (IP) address that appears in a database that lists IP addresses and Domain Name System (DNS) names associated with known botnet activity.

13. The system recited in claim 1, further comprising a log aggregator configured to:
   collect one or more logs that describe the connections observed in the network that are associated with potential botnet activity; and
   detect the potential botnet activity if at least one connection observed in the network has a source or destination Internet Protocol (IP) address or queries a Domain Name System (DNS) IP address that appears in a database that lists known botnet IP addresses.

14. The system recited in claim 13, wherein the log aggregator is further configured to generate a report that describes the potential botnet activity and indicates whether the at least one connection associated with the potential botnet activity originated from a source IP address associated with a malicious botnet or an internal host that reached out to a destination IP address associated with the malicious botnet.

15. The system recited in claim 1, wherein the one or more active scanners are further configured to:
   examine local or resident anti-virus agents deployed in the network to audit an anti-malware strategy deployed in the network; and
   generate a report to indicate whether the audited anti-malware strategy provides appropriate protection against virus or malware outbreaks in the network.

16. A method for strategic anti-malware monitoring in a network, comprising:
   remotely scanning a host in the network to enumerate one or more processes running on the remotely scanned host and compute unique signatures associated with the one or more enumerated processes;
   communicating the unique signatures associated with the enumerated process running on the remotely scanned host to a cloud database, wherein the cloud database aggregates signatures associated with known virus or malware samples that multiple different anti-virus vendors have catalogued;
   receiving a message from the cloud database that indicates whether the unique signatures associated with the enumerated processes running on the remotely scanned host match any signatures associated with the known virus or malware samples that the multiple different anti-virus vendors have catalogued; and
   generating a report to indicate that the remotely scanned host has a malware infection if the message received from the cloud database indicates that the unique signature associated with at least one enumerated process running on the remotely scanned host matches the signature associated with at least one known virus or malware sample that the multiple different anti-virus vendors have catalogued.

17. The method recited in claim 16, wherein the remotely scanned host does not have a local or resident anti-virus agent.

18. The method recited in claim 16, wherein the unique signatures associated with the enumerated processes running on the remotely scanned host include cryptographic hashes or cryptographic checksums.

19. The method recited in claim 16, wherein remotely scanning the host to enumerate the running processes and compute the unique signatures associated therewith includes:
   uploading a dissolvable agent to the remotely scanned host to enumerate the one or more processes running thereon and compute the unique signatures associated therewith; and
   removing the dissolvable agent from the remotely scanned host subsequent to communicating the unique signatures associated with the enumerated processes to the cloud database.

20. The method recited in claim 16, further comprising generating a report to indicate that one or more additional hosts in the network have the malware infection if the one or more additional hosts are running processes that have unique signatures matching the unique signature associated with the at least one enumerated process on the remotely scanned host that matched the signature associated with the at least one known virus or malware sample.

21. The method recited in claim 16, further comprising:
   comparing a file system associated with the remotely scanned host to a trusted file system known to have no malware infections; and
   identifying one or more suspicious files in the file system associated with the remotely sunned host, wherein the one or more suspicious files do not appear in the trusted file system or have unique signatures that differ from corresponding files in the trusted file system.

22. The method recited in claim 16, further comprising:
   communicating the unique signatures associated with the one or more suspicious files to the cloud database that aggregates the signatures associated with the known virus or malware samples that the multiple different anti-virus vendors have catalogued; and
   generating a report to indicate that the remotely scanned host has been infected with malware if the unique signature associated with at least one suspicious file on the remotely scanned host matches the signature associated with at least one known virus or malware sample that the multiple different anti-virus vendors have catalogued.

23. The method recited in claim 16, further comprising:
configuring one or more passive scanners to observe connections in the network and identify one or more events and vulnerabilities potentially associated with a virus or malware outbreak in the network; and
querying one or more logs that describe the connections observed with the one or more passive scanners and system processes that have occurred in the network in response to the report indicating that the remotely scanned host has the malware infection to isolate where the malware infection was introduced into the network and to evaluate the extent to which the malware infection has propagated or spread throughout the network.

24. The method recited in claim 23, further comprising:
detecting one or more events in the one or more logs indicating that the virus or malware outbreak has potentially occurred in the network, wherein the one or more detected events include one or more of a host in the network running a new executable for the first time, a new executable running in the network for the first time, or a known executable being invoked in a new manner for the first time; and
querying the cloud database using a unique signature associated with the new executable or the known executable invoked in the new manner to determine whether the one or more detected events reflect an actual virus or malware outbreak in the network.

25. The method recited in claim 16, further comprising:
determining a network configuration associated with the remotely scanned host, wherein the determined network configuration includes an Internet Protocol (IP) address associated with the remotely scanned host and a Domain Name System (DNS) IP address used on the remotely scanned host; and
detecting that the remotely scanned host participates in an active botnet if the IP address associated therewith or the DNS IP address used thereon appears in a database that lists known botnet IP addresses.

26. The method recited in claim 16, further comprising:
enumerating one or more active connections on the remotely scanned host; and
detecting that the remotely scanned host participates in an active botnet if at least one active connection enumerated on the remotely scanned host has a source or destination Internet Protocol (IP) address that appears in a database that lists known botnet IP addresses.

27. The method recited in claim 16, further comprising:
scanning a web application on the remotely scanned host to identify one or more external network addresses to which the scanned web application points; and
detecting that the remotely scanned host links to malicious content if at least one external network address to which the scanned web application points corresponds to an Internet Protocol (IP) address that appears in a database that lists IP addresses and Domain Name System (DNS) names associated with known botnet activity.

28. The method recited in claim 16, further comprising:
collecting one or more logs that describe the connections observed in the network that are associated with potential botnet activity;
detecting the potential botnet activity if at least one connection observed in the network has a source or destination Internet Protocol (IP) address or queries a Domain Name System (DNS) IP address that appears in a database that lists known botnet IP addresses; and
generating a report that describes the potential botnet activity and indicates whether the at least one connection associated with the potential botnet activity originated from a source IP address associated with a malicious botnet or an internal host that reached out to a destination IP address associated with the malicious botnet.

29. The method recited in claim 16, further comprising:
examining local or resident anti-virus agents deployed in the network to audit an anti-malware strategy deployed in the network; and
generating a report to indicate whether the audited anti-malware strategy provides appropriate protection against virus or malware outbreaks in the network.

30. A non-transitory computer-readable storage medium having computer-executable instructions stored thereon for strategic anti-malware monitoring in a network, wherein executing the computer-executable instructions one or more processors causes the one or more processors to:
remotely scan a host in the network to enumerate one or more processes running on the remotely scanned host and compute unique signatures associated with the one or more enumerated processes;
communicate the unique signatures associated with the enumerated processes running on the remotely scanned host to a cloud database, wherein the cloud database aggregates signatures associated with known virus or malware samples that multiple different anti-virus vendors have catalogued;
receive a message from the cloud database that indicates whether the unique signatures associated with the enumerated processes running on the remotely scanned host match any signatures associated with the known virus or malware samples that the multiple different anti-virus vendors have catalogued; and
generate a report to indicate that the remotely scanned host has a malware infection if the message received from the cloud database indicates that the unique signature associated with at least one enumerated process running on the remotely scanned host matches the signature associated with at least one known virus or malware sample that the multiple different anti-virus vendors have catalogued.

* * * * *